United States Patent
He et al.

(10) Patent No.: US 8,150,159 B2
(45) Date of Patent: Apr. 3, 2012

(54) IDENTIFYING METHOD OF HAND-WRITTEN LATIN LETTER

(75) Inventors: Jiaming He, Ningbo (CN); Jianfen Wen, Ningbo (CN); Dexiang Jia, Ningbo (CN); Jing Chen, Ningbo (CN); Ping Chen, Ningbo (CN); Chengchen Ma, Ningbo (CN); Zhouyi Fan, Ningbo (CN); Hongzhen Ding, Ningbo (CN); Zhihui Shi, Ningbo (CN); Aijun Shi, Ningbo (CN); Linghui Fan, Ningbo (CN); Qingbo Zhang, Ningbo (CN)

(73) Assignee: Ningbo Sunrun Elec. & Info. ST & D Co., Ltd., Ningbo, Zhejiang Province (CN)

( * ) Notice: Subject to any disclaimer, the term of this patent is extended or adjusted under 35 U.S.C. 154(b) by 598 days.

(21) Appl. No.: 12/396,523

(22) Filed: Mar. 3, 2009

(65) Prior Publication Data

US 2010/0135576 A1  Jun. 3, 2010

(30) Foreign Application Priority Data

Dec. 1, 2008  (CN) .......................... 2008 1 0162777

(51) Int. Cl.
*G06K 9/18* (2006.01)

(52) U.S. Cl. ......................... 382/182; 382/185; 382/224

(58) Field of Classification Search ................... 382/182
See application file for complete search history.

(56) References Cited

U.S. PATENT DOCUMENTS

| | | | | |
|---|---|---|---|---|
| 5,475,767 A * | 12/1995 | Du | ............... | 382/185 |
| 5,734,893 A * | 3/1998 | Li et al. | ......................... | 707/694 |
| 5,832,118 A * | 11/1998 | Kim | ............... | 382/224 |
| 5,835,633 A * | 11/1998 | Fujisaki et al. | ............... | 382/187 |
| 5,940,535 A * | 8/1999 | Huang | ........................ | 382/201 |
| 5,963,653 A * | 10/1999 | McNary et al. | ............... | 382/103 |
| 6,426,751 B1 * | 7/2002 | Patel et al. | ..................... | 345/468 |
| 8,036,465 B2 * | 10/2011 | Khomo | ........................ | 382/187 |
| 2010/0080463 A1 * | 4/2010 | He et al. | ........................ | 382/186 |
| 2010/0135576 A1 * | 6/2010 | He et al. | ........................ | 382/186 |

* cited by examiner

*Primary Examiner* — Sath V Perungavoor

(57) ABSTRACT

The present invention discloses an identifying method of hand-written Latin letter. The present invention considers many hand-written styles of Latin letter, extract many stable characteristics of Latin letter of different hand-written styles, and classify the Latin letter aggregation each time with one characteristic, so that the whole standard Latin letter aggregation is classified into many small Latin letter aggregations with intersection to be the coarse classification candidate letter aggregations to be identified. When identifying the inputted hand-written Latin letter, obtain the coarse classification candidate letter aggregation that matches with the characteristics of the inputted hand-written Latin letter. Many stable characteristics ensure the identifying rate. The multi-layer coarse classification candidate letter aggregations regulate the searching path and increase the identifying speed.

9 Claims, 6 Drawing Sheets

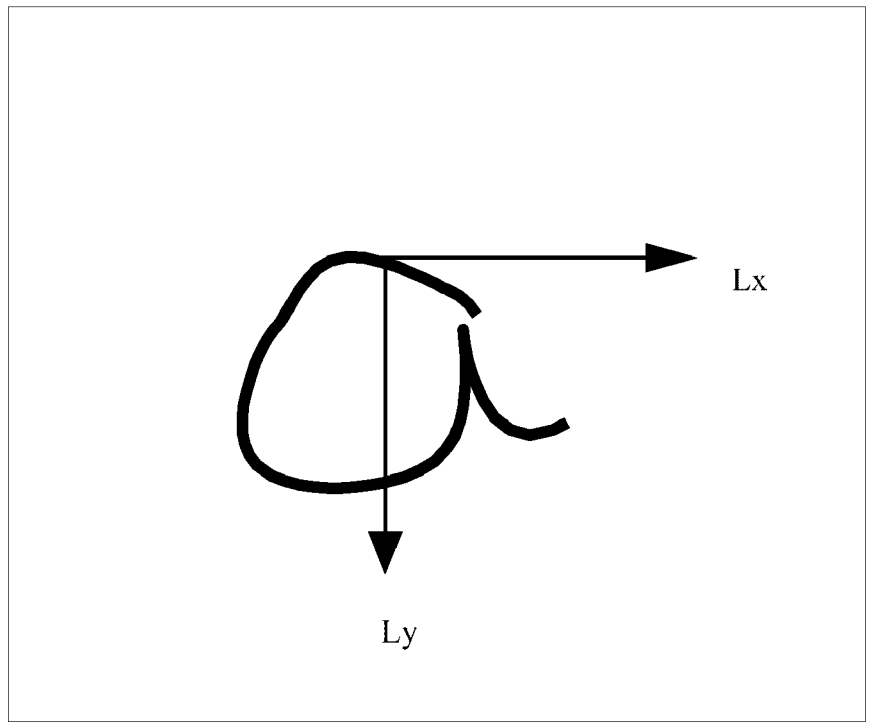
Fig.4
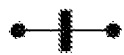    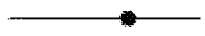
Fig.5a     Fig.5b     Fig.5c     Fig.5d     Fig.5e

IDENTIFYING METHOD OF HAND-WRITTEN LATIN LETTER

BACKGROUND OF THE PRESENT INVENTION

1. Field of Invention

The present invention relates to a method for identifying hand-written style, and more particularly to an identifying method of hand-written Latin letter.

2. Description of Related Arts

With rapid development of information technology, various kinds of hand-written identifying technique are developing, and many commercial identifying systems are available on the market. The recent researches focus on identifying system for all kinds of hand-written letter including Latin letter. Though the character set of Latin letter is small, the mere difference on structure and shape of some Latin letters, such as hand-written a, b, q, p, n, h and so on, may bring difficulty on identifying Latin letter. At present, some hand-written Latin letter identifying systems utilize the direction of the stroke and the position relationship of the neighboring strokes as a first class characterization. The stroke direction includes 4-direction code and 8-direction code. The position relationship between two neighboring strokes includes connecting, jointing, crossing, parallel, and apart. Furthermore, the hand-written Latin letter identifying systems utilize the coordinate of one stroke as a second class characterization, such as the coordinate of the center of one stroke, the coordinate of the beginning of one stroke, the coordinate of the end of one stroke, the coordinate of the top point of one transverse stroke, the coordinate of the bottom point of one transverse stroke, the coordinate of the left point of one upright stroke and the coordinate of the right point of one upright stroke. Such identifying systems rely on the extraction and classification of the strokes in both first class and second class characterizations. However, the stroke of many hand-written Latin letters, such as a, b, q, p, n, h and so on, is ambiguous due to many arches. Therefore, utilizing stroke characterization to identify Latin letter greatly lowers the identifying rate.

SUMMARY OF THE PRESENT INVENTION

An object of the present invention is to provide an identifying method of hand-written Latin letter utilizing a multi-layer classification based on the local characteristics of Latin letter, so as to reduce a research range for identifying inputted hand-written Latin letter, increase the identifying speed, and increase the identifying rate.

Accordingly, in order to accomplish the above object, the present invention provides an identifying method of hand-written Latin letter comprising following steps of:

(a) collecting chirography coordinates of hand-written Latin letter that are inputted in a terminal unit, and storing said chirography coordinates into a predefined structural array in real time;

(b) obtaining new chirography coordinate lattice by pre-processing chirography coordinates and chirography coordinates lattice in a matrix format transformed from said chirography coordinates stored in a structural array;

(c) Classifying all standard Latin letters in different layers according to characteristics of each Latin letter during the hand writing, to obtain a coarse classification candidate letter aggregation matching with the inputted hand-written Latin letter, wherein step (c) comprises steps of:

(c.1) classifying all standard Latin letter into up-down structure coarse classification candidate letter aggregation and non-up-down structure coarse classification candidate letter aggregation, according to whether the hand-written Latin letter is up-down structure or not, wherein the up-down structure coarse classification candidate letter aggregation includes standard Latin letters with inherent up-down structure during the hand-writing and standard Latin letters with up-down structure caused by the hand-writing, and the non-up-down structure coarse classification candidate letter aggregation includes the standard Latin letters without inherent up-down structure;

(c.2) classifying the up-down structure coarse classification candidate letter aggregation into transverse stroke coarse classification candidate letter aggregation and non-transverse stroke coarse classification candidate letter aggregation, according to whether the last stroke of the hand-written standard Latin letter is transverse stroke or not, and take these two coarse classification candidate letter aggregations as the coarse classification candidate letter aggregation that matches with the inputted hand-written Latin letter, wherein the transverse stroke coarse classification candidate letter aggregation includes the hand-written standard Latin letters with inherent transverse last stroke and the hand-written standard Latin letters with transverse last stroke caused by the hand writing; the non-transverse stroke coarse classification candidate letter aggregation includes the hand-written standard Latin letters without inherent transverse last stroke; classifying the non-up-down structure coarse classification candidate letter aggregation into the coarse classification candidate letter aggregations with H=1, 2, 3, and 4, according to the transverse cross number H during the hand writing;

(c.3) classifying the coarse classification candidate letter aggregation with H=1 into the coarse classification candidate letter aggregations with S=1, 2, 3, and 4, according to the vertical cross number S during the hand writing, and take these four coarse classification candidate letter aggregations as the coarse classification candidate letter aggregation that matches with the inputted hand-written Latin letter; classifying the coarse classification candidate letter aggregation with H=2 into the coarse classification candidate letter aggregations with UP=1, 2, and 3, according to the transverse cross number UP in the ⅓ upper portion of the Latin letter during the hand writing, and take the UP=2 and UP=3 coarse classification candidate letter aggregations as the coarse classification candidate letter aggregation that matches with the inputted hand-written Latin letter; classifying the coarse classification candidate letter aggregation with H=3 into the coarse classification candidate letter aggregations with Maxs=1, 2, and 3, according to the optimal vertical cross number Maxs during the hand writing, and take the Maxs=2 and Maxs=3 coarse classification candidate letter aggregations as the coarse classification candidate letter aggregation that matches with the inputted hand-written Latin letter; classifying the coarse classification candidate letter aggregation with H=4 into the coarse classification candidate letter aggregations with Down=1, 2, and 3, according to the transverse cross number Down in the lower ⅓ portion of the Latin letter during the hand writing, and take the Down=2 and Down=3 coarse classification candidate letter aggregations as the coarse classification candidate letter aggregation that matches with the inputted hand-written Latin letter;

(c.4) classifying the coarse classification candidate letter aggregation with UP=1 into the coarse classification candidate letter aggregations with S1=1, 2, and 3, according to the vertical cross number S1 during the hand writing; classifying the coarse classification candidate letter aggregation with Maxs=1 into the coarse classification candidate letter aggregations with first right-up position, first left-down position, first left-down position and first right-down position, according to the position information of the last new chirography coordinate point of the new chirography coordinate lattice in the standard Latin letter during the hand writing; classifying the coarse classification candidate letter aggregation with Down=1 into the coarse classification candidate letter aggregations with S2=1, 2, and 3, according to the vertical cross number S2 during the hand writing;

(c.5) classifying the coarse classification candidate letter aggregation with S1=1 into the coarse classification candidate letter aggregations with second right-up position, second left-down position, second left-down position and second right-down position, according to the position information of the last new chirography coordinate point of the new chirography coordinate lattice in the standard Latin letter during the hand writing; classifying the coarse classification candidate letter aggregation with S1=2 into the coarse classification candidate letter aggregations with third right-up position, third left-down position, third left-down position and third right-down position, according to the position information of the last new chirography coordinate point of the new chirography coordinate lattice in the standard Latin letter during the hand writing; classifying the coarse classification candidate letter aggregation with S1=3 into the coarse classification candidate letter aggregations with fourth right-up position, fourth left-down position, fourth left-down position and fourth right-down position, according to the position information of the last new chirography coordinate point of the new chirography coordinate lattice in the standard Latin letter during the hand writing; classifying the coarse classification candidate letter aggregation with first left-up position into the coarse classification candidate letter aggregations with first left arch opening and first non-left arch opening, according to whether there is left arch opening during the hand writing, and take the two coarse classification candidate letter aggregations as the coarse classification candidate letter aggregation that matches with the inputted hand-written Latin letter; classifying the coarse classification candidate letter aggregation with first left-down position, first right-up position and first right-down into the coarse classification candidate letter aggregations with second left arch opening and second non-left arch opening, third left arch opening and third non-left arch opening, fourth left arch opening and fourth non-left arch opening respectively, according to whether there is left arch opening during the hand writing; classifying the coarse classification candidate letter aggregation with S2=1 into the coarse classification candidate letter aggregations with fifth right-up position, fifth left-down position, fifth left-down position and fifth right-down position, according to the position information of the last new chirography coordinate point of the new chirography coordinate lattice in the standard Latin letter during the hand writing; classifying the coarse classification candidate letter aggregation with S2=2 into the coarse classification candidate letter aggregations with sixth right-up position, sixth left-down position, sixth left-down position and sixth right-down position, according to the position information of the last new chirography coordinate point of the new chirography coordinate lattice in the standard Latin letter during the hand writing; classifying the coarse classification candidate letter aggregation with S2=3 into the coarse classification candidate letter aggregations with seventh right-up position, seventh left-down position, seventh left-down position and seventh right-down position, according to the position information of the last new chirography coordinate point of the new chirography coordinate lattice in the standard Latin letter during the hand writing;

(c.6) classifying the coarse classification candidate letter aggregation with second left-up position into the coarse classification candidate letter aggregations with fifth left arch opening and fifth non-left arch opening, according whether there is left arch opening or not during the hand writing, and take the two coarse classification candidate letter aggregations as the coarse classification candidate letter aggregation that matches with the inputted hand-written Latin letter; classifying the coarse classification candidate letter aggregation with second left-down position, second right-up position and second right-down into the coarse classification candidate letter aggregations with sixth left arch opening and sixth non-left arch opening, seventh left arch opening and seventh non-left arch opening, eighth left arch opening and eighth non-left arch opening respectively, according to whether there is left arch opening during the hand writing; classifying the coarse classification candidate letter aggregation with third left-up position into the coarse classification candidate letter aggregations with ninth left arch opening and ninth non-left arch opening, according whether there is left arch opening or not during the hand writing, and take the two coarse classification candidate letter aggregations as the coarse classification candidate letter aggregation that matches with the inputted hand-written Latin letter; classifying the coarse classification candidate letter aggregation with third left-down position, third right-up position and third right-down into the coarse classification candidate letter aggregations with tenth left arch opening and tenth non-left arch opening, eleventh left arch opening and eleventh non-left arch opening, twelfth left arch opening and twelfth non-left arch opening respectively, according to whether there is left arch opening during the hand writing; classifying the coarse classification candidate letter aggregation with fourth left-up position into the coarse classification candidate letter aggregations with thirteenth left arch opening and thirteenth non-left arch opening, according whether there is left arch opening or not during the hand writing, and take the two coarse classification candidate letter aggregations as the coarse classification candidate letter aggregation that matches with the inputted hand-written Latin letter; classifying the coarse classification candidate letter aggregation with fourth left-down position, fourth right-up position and fourth right-down into the coarse classification candidate letter aggregations with fourteenth left arch opening and fourteenth non-left arch opening, fifteenth left arch opening and fifteenth non-left arch opening, sixteenth left arch opening and sixteenth non-left arch opening respectively, according to whether there is left arch opening during the hand writing; classifying the coarse classification candidate letter aggregation with fifth left-up position into the coarse classification candidate letter aggregations with seventeenth left arch opening and seventeenth non-left arch opening, according whether there is left arch opening or not during the hand writing, and take the two coarse classification candidate letter aggregations as the coarse classification candidate letter aggregation that matches with the inputted hand-written Latin letter; classifying the coarse classification candidate letter aggregation with fifth left-down position, fifth right-up position and fifth right-down into the coarse classification candidate letter aggregations with eighteenth left arch opening and eighteenth non-left arch opening, nineteenth left arch opening and nineteenth non-left arch opening, twentieth left arch opening and twentieth non-left arch opening respectively, according to whether there is left arch opening during the hand writing; classifying the coarse classification candidate letter aggregation with sixth left-up position into the coarse classification candidate letter aggregations with twenty-first left arch opening and twenty-first non-left arch opening, according whether there is left arch opening or not during the hand writing, and take the two coarse classification candidate letter aggregations as the coarse classification candidate letter aggregation that matches with the inputted hand-written Latin letter; classifying the coarse classification candidate letter aggregation with sixth left-down position, sixth right-up position and sixth right-down into the coarse classification candidate letter aggregations with twenty-second left arch opening and twenty-second non-left arch opening, twenty-third left arch opening and twenty-third non-left arch opening, twenty-fourth left arch opening and twenty-fourth non-left arch opening respectively, according to whether there is left arch opening during the hand writing; classifying the coarse classification candidate letter aggregation with seventh left-up position into the coarse classification candidate letter aggregations with twenty-fifth left arch opening and twenty-fifth non-left arch opening, according whether there is left arch opening or not during the hand writing, and take the two coarse classification candidate letter aggregations as the coarse classification candidate letter aggregation that matches with the inputted hand-written Latin letter; classifying the coarse classification candidate letter aggregation with seventh left-down position, seventh right-up position and seventh right-down into the coarse classification candidate letter aggregations with twenty-sixth left arch opening and twenty-sixth non-left arch opening, twenty-seventh left arch opening and twenty-seventh non-left arch opening, twenty-eighth left arch opening and twenty-eighth non-left arch opening respectively, according to whether there is left arch opening during the hand writing;

(d) according to the local characteristic of the inputted hand-written Latin letter, matching the inputted hand-written Latin letter with the coarse classification candidate letter aggregation of each aggregation obtained in step (c), and obtain the coarse classification candidate letter aggregation matched with the inputted hand-written Latin letter;

(e) extracting a freeman chain code of inputted hand-written Latin letter; calculating a matching probability between the freeman chain code of the inputted hand-written Latin letter and the optimal Hidden Markov Model of each standard letter stored in a predetermined letter library and corresponding to each letter stored in the coarse classification candidate letter aggregation matched with the inputted hand-written Latin letter; obtaining an optimized matching probability from each matching probability; determining that the standard letter stored in the predetermined letter library and corresponding to the optimized matching probability as the final identifying result of inputted hand-written Latin letter.

The step (b) comprises the following steps of:

(b.1) smoothly filtering said chirography coordinates stored in the structural array, removing hardware noise, and eliminating burr and broken line formed in writing process;

(b.2) linearly and nonlinearly normalizing said chirography coordinate point lattice in the matrix format transformed from said chirography coordinates processed in step (b.1) by using linear normalization and non-linear normalization algorithm of on-line single-point width hand-written style to obtain new chirography coordinate point lattice;

(b.3) adding points to said new chirography coordinate point lattice processed by step (b.2) to prevent from loosing effective characteristic point.

The step (b.2) comprises steps of:

(b.2.1) linearly normalizing said chirography coordinate point lattice in the matrix format transformed from said chirography coordinates processed in step (b.1) to a standard coordinate point lattice by adopting coordinates frame scaling and direct projection method;

(b.2.2) expressing standard coordinate point of standard coordinate point lattice as (x,y), and classifying said standard coordinate point (x,y) into a chirography coordinate point and a non-chirography coordinate point;

(b.2.3) calculating a density function d(x,y) of said standard coordinate point (x,y), $$d(x, y) = \begin{cases} \text{Max}(A/Lx, A/Ly), & Lx + Ly \pi 6A \\ 0, & Lx + Ly \geq 6A \end{cases},$$

wherein, Lx is a transverse density of a current standard coordinate point, Ly is a vertical density of a current standard coordinate point, A is a length of said standard coordinate point lattice, and the value of A is 64;

(b.2.4) calculating a level density projection function H(x) and a vertical density projection function V(y) of said standard coordinate point (x,y) according to said density function d(x,y) of said standard coordinate point (x,y)

$$H(x) = \sum_{y=1}^{J} [d(x, y) + a_H],$$

$$V(y) = \sum_{x=1}^{I} [d(x, y) + a_V],$$

wherein, d(x,y) is said density function of said standard coordinate point (x,y), I×J is a dimension of said standard coordinate point lattice, a value of I×J is 64×64, $a_H$ and $a_v$ are correction coefficient, and both value of $a_H$ and $a_v$ are 0.1;

(b.2.5) non-linearly normalizing said chirography coordinate point lattice by using a level density projection function H(x) and a vertical density projection function V(y) to obtain a new chirography coordinate point lattice, $$m = \sum_{x=1}^{i} H(x) \times \frac{M}{\sum_{x=1}^{I} H(x)},$$

$$n = \sum_{y=1}^{j} V(y) \times \frac{N}{\sum_{y=1}^{J} V(y)},$$

wherein I×J is the dimension of said standard coordinate point lattice, the value of I×J is 64×64; M×N is a dimension of said new chirography coordinate point lattice processed by non-linear normalization algorithm, a predetermined value of M×N is 64×64; (m,n) is a coordinate point of said new chirography coordinate point lattice; i=1,2, . . . ,I , j=1,2, . . . ,J.

The step (d) comprises steps of:

(d.1) determining whether the inputted hand-written Latin letter is up-down structure, wherein if the inputted hand-written Latin letter is up-down structure, determine whether the last stroke is transverse or not, wherein if the last stroke is transverse, directly determine that the coarse classification candidate letter aggregation matched with the inputted hand-written Latin letter is the transverse stroke coarse classification candidate letter aggregation; if the last stroke is not transverse, directly determine that the coarse classification candidate letter aggregation matched with the inputted handwritten Latin letter is the non-transverse stroke coarse classification candidate letter aggregation; if the inputted handwritten Latin letter is not up-down structure, carry out the following step;

(d.2) calculating the transverse cross number H, wherein when the transverse cross number is 1, calculate the vertical cross number, and determine the coarse classification candidate letter aggregation that matched with inputted hand-written Latin letter is the coarse classification candidate letter aggregation with S=1, S=2, S=3 or S=4 according to different vertical cross number; when the transverse cross number is 2, calculate the transverse cross number UP in the ⅓ upper portion of the Latin letter, wherein when the transverse cross number in the ⅓ upper portion of the Latin letter is 2 or 3, directly determine that the coarse classification candidate letter aggregation matched with the inputted hand-written Latin letter is the coarse classification candidate letter aggregation with UP=2 or UP=3; when the transverse cross number in the ⅓ upper portion of the Latin letter is 1, calculate the vertical cross number of the hand-written Latin letter, and determine the coarse classification candidate letter aggregation that matched with inputted hand-written Latin letter according to the vertical cross number and the position information of the last new chirography coordinate point of the new chirography coordinate lattice in the standard Latin letter during the hand writing, and whether the left arch opening of the inputted Latin letter existing or not; when H=3, calculate the optimal vertical cross number of the inputted Latin letter, wherein when the optimal vertical cross number is 2 or 3, directly determine that the coarse classification candidate letter aggregation that matched with inputted hand-written Latin letter is the coarse classification candidate letter aggregation with Maxs=2 or Maxs=3; when the optimal vertical cross number is 1, determine the coarse classification candidate letter aggregation that matched with inputted hand-written Latin letter according to the position information of the last new chirography coordinate point of the new chirography coordinate lattice in the standard Latin letter during the hand writing, and whether the left arch opening of the inputted Latin letter existing or not; when H=4, calculate the transverse cross number Down in the ⅓ lower portion of the Latin letter, wherein when the transverse cross number in the ⅓ lower portion of the Latin letter is 2 or 3, directly determine that the coarse classification candidate letter aggregation matched with the inputted hand-written Latin letter is the coarse classification candidate letter aggregation with Down=2 or Down=3; when the transverse cross number in the ⅓ lower portion of the Latin letter is 1, calculate the vertical cross number of the hand-written Latin letter, and determine the coarse classification candidate letter aggregation that matched with inputted hand-written Latin letter according to the vertical cross number and the position information of the last new chirography coordinate point of the new chirography coordinate lattice in the standard Latin letter during the hand writing, and whether the left arch opening of the inputted Latin letter existing or not.

The step (d.1) comprises the following steps of (d.1.1) scanning the new chirography coordinate lattice row by row from top to bottom, wherein when meet with the first new chirography coordinate point, set the row value to the current row under scanning, and define the row value as the top boundary of the letter, and scanning the new chirography coordinate lattice row by row from bottom to top, wherein when meet with the first new chirography coordinate point, set the row value to the current row under scanning, and define the row value as the bottom boundary of the letter; (d.1.2) scanning from the top boundary to the bottom boundary, record the number of the blank row where there is not new chirography coordinate point during the scanning, wherein when the number of the blank row equals to or is larger than 3 and next row of the last blank row of continuous blank rows is not blank, determine the inputted Latin latter is up-down structure.

In step (d.2), the calculation of the transverse cross number of the inputted hand-written Latin latter comprises the following steps of: (d.2.1a) scanning each row of the new chirography coordinate lattice transversely, and recording the times of non new chirography coordinate point changing to new chirography coordinate point, wherein the changing times is the initial transverse cross number; (d.2.2a) comparing the initial transverse cross number of each row in the new chirography coordinate lattice, and finding out the largest transverse cross number of the initial transverse cross numbers as the final transverse cross number of the letter; in step (d.2), the calculation of the vertical cross number of the inputted hand-written Latin latter comprises the following steps of: (d.2.1b) scanning each row of the new chirography coordinate lattice vertically, and recording the times of non new chirography coordinate point changing to new chirography coordinate point, wherein the changing times is the initial vertical cross number; (d.2.2b) comparing the initial vertical cross number of each row in the new chirography coordinate lattice, finding out all the initial vertical cross numbers that equals to 3 or is larger than 3, and finding out the largest vertical cross number of the initial vertical cross numbers as the final vertical cross number of the letter; in step (d.2), the calculation of the transverse cross number in the ⅓ upper portion and ⅓ lower portion of the hand-written Latin letter comprises the following steps of: (d.2.1c) scanning the new chirography coordinate lattice row by row from top to bottom, wherein when meet with the first new chirography coordinate point, set the row value to the current row under scanning, and define the row value as the top boundary of the letter i1, and scan the new chirography coordinate lattice row by row from bottom to top, wherein when meet with the first new chirography coordinate point, set the row value to the current row under scanning, and define the row value as the bottom boundary of the letter i2; (d.1.2c) calculating the ⅓ upper portion boundary i3, wherein i3=i1+⅓(i2−i1), and taking the rows between the top boundary i1 and the ⅓ upper portion boundary i3 as the ⅓ upper portion of the Latin letter; calculating the ⅓ lower portion boundary i4, wherein i4=i1+⅔(i2−i1), and take the rows between the bottom boundary i2 and the ⅓ lower portion boundary i4 as the ⅓ lower portion of the Latin letter; (d.1.3c) according to the calculation process of the transverse cross number of whole Latin letter, obtaining the initial transverse cross number of each row from the top boundary i1 to the upper boundary row i3, finding out all the initial transverse cross numbers that equals to 3 or is larger than 3, and finding out the largest transverse cross number of the initial transverse cross numbers as the final transverse cross number in the ⅓ upper portion of the letter; obtaining the transverse cross number in the ⅓ lower portion of the letter in the similar process mentioned above; in step (d.2), the calculation of the optimal vertical cross number of the inputted hand-written Latin letter comprises the following step of: (d.2.1d) during the calculation process of the vertical cross number of each row in the new chirography coordinate lattice, calculating the times of each initial vertical cross number, and taking the most frequently times as the optimal vertical cross number.

In step (d.2), the determining process of the position of the last new chirography coordinate point in the new chirography coordinate lattice comprises the following steps of: (d.2.1e) scanning the new chirography coordinate lattice row by row from top to bottom, wherein when meet with the first new chirography coordinate point, set the row value to the current row under scanning, and define the row value as the top boundary of the letter i1, and scanning the new chirography coordinate lattice row by row from bottom to top, wherein when meet with the first new chirography coordinate point, set the row value to the current row under scanning, and define the row value as the bottom boundary of the letter i2; scanning the new chirography coordinate lattice row by row from left to right, wherein when meet with the first new chirography coordinate point, set the row value to the current row under scanning, and define the row value as the left boundary of the letter j1, and scanning the new chirography coordinate lattice row by row from right to left, wherein when meet with the first new chirography coordinate point, set the row value to the current row under scanning, and define the row value as the right boundary of the letter j2, wherein the top boundary i1, bottom boundary i2, left boundary j1, and the right boundary j2 constitute the smallest outer rectangle frame of the hand-written Latin letter; (d.2.2e) dividing the smallest outer rectangle frame evenly into a left-up rectangle frame, a left-down rectangle frame, a right-up rectangle frame, a right-down rectangle frame; (d.2.3e) determining that the last new chirography coordinate point falls into the left-up rectangle frame, the left-down rectangle frame, the right-up rectangle frame or the right-down rectangle frame, wherein when the last new chirography coordinate point falls into the left-up rectangle frame, the last new chirography coordinate point is in the left-up position of the inputted hand-written Latin letter; when the last new chirography coordinate point falls into the left-down rectangle frame, the last new chirography coordinate point is in the left-down position of the inputted hand-written Latin letter; when the last new chirography coordinate point falls into the right-up rectangle frame, the last new chirography coordinate point is in the right-up position of the inputted hand-written Latin letter; when the last new chirography coordinate point falls into the right-down rectangle frame, the last new chirography coordinate point is in the right-down position of the inputted hand-written Latin letter.

In step (d.2), the determining process of whether left arch opening existing in the hand-written Latin letter or not comprises the following steps of (d.2.1f) calculating the initial vertical cross number of each column in the new chirography coordinate lattice; (d.2.2f) scanning from the right column to the left column, finding out the first column whose the initial vertical cross number is not 0, and recording the column as k; (d.2.3f) when the initial vertical cross number of the (k−1)th column is larger than the initial vertical cross number of the kth column, defining the kth column as the reference column; when the initial vertical cross number of the (k−1)th column is smaller than the initial vertical cross number of the kth column, stopping scanning and determine that there is no left arch opening in this letter; when the initial vertical cross number of the (k−1)th column equals to the initial vertical cross number of the kth column, keeping scanning to the left until the initial vertical cross number of the (k−1)th column does not equal to the initial vertical cross number of the kth column, and defining the scanned column as the reference column; (d.2.4f) when the reference column is determined, recording the vertical ordinate of the mth in-through point Im_in on the scanned reference column, that is the row ordinate of the in-through point Im_in in the new chirography coordinate lattice, recording the vertical ordinate of the mth out-through point Im_out, that is the row ordinate of the out-through point Im_out in the new chirography coordinate lattice, recording the vertical ordinate of the nth in-through point Jn_in on the scan line of the left column Ref_line_i−1 of next reference column, that is the row ordinate of the in-through point Jn_in in the new chirography coordinate lattice, and recording the vertical ordinate of the nth out-through point Jn_out on the scan line of the left column Ref_line_i−1 of next reference column, that is the row ordinate of the out-through point Jn_out in the new chirography coordinate lattice, wherein m=1,2, . . . M, n=1,2, . . . N, M is the total number of the in-through point and out-through point of the scan line of the reference column, and N is the total number of the in-through point and out-through point of the scan line of the left column to the reference column; (d.2.5f) finding out the middle point Im_mid between each couple of matched the in-through point Im_in and the out-thought point Im_out on the scan line of the reference column; (d.2.6f) calculating the first straight distance between the each middle point Im_mid and the nth in-through point Jn_in, and finding out the in-through point on the scan line of the left column to the reference column that satisfy the first straight distance is less than or equals to 2; calculating the second straight distance between the each middle point Im_mid and the nth in-through point Jn_out, and finding out the out-through point on the scan line of the left column to the reference column that satisfy the second straight distance is less than or equals to 2, wherein n=1,2, . . . N, and N is the total number of the in-through point and out-through point of the scan line of the left column to the reference column; (d.2.7f) calculating the middle point between the pth in-through point on the scan line of the left column to the reference column that satisfy the first straight distance is less than or equals to 2 and the pth out-through point on the scan line of the left column to the reference column that satisfy the first straight distance is less than or equals to 2, and determining whether a point of same row with one of the calculated middle points on the scan line of the reference column is 0 or not, wherein when the point of same row with one of the calculated middle points on the scan line of the reference column is not 0, determine that there is left arch opening in the inputted handwritten Latin letter; when the point of same row with one of the calculated middle points on the scan line of the reference column is 0, determine that there is no left arch opening in the inputted handwritten Latin letter; wherein p=1, 2 . . . P, when the total number of the in-through points on the scan line on the left column to the reference column that satisfy the first straight distance is less than or equals to 2 is less than the total number of the out-through points on the scan line on the left column to the reference column that satisfy the second straight distance is less than or equals to 2, P is the total number of the in-through points on the scan line on the left column to the reference column that satisfy the first straight distance is less than or equals to 2; when the total number of the in-through points on the scan line on the left column to the reference column that satisfy the first straight distance is less than or equals to 2 is more than the total number of the out-through points on the scan line on the left column to the reference column that satisfy the second straight distance is less than or equals to 2, P is the total number of the out-through points on the scan line on the left column to the reference column that satisfy the second straight distance is less than or equals to 2.

The step (e) comprises the following steps of: (e.1) extracting the freeman chain code of the inputted hand-written Latin letter; (e.2) calculating the matching probability between the freeman chain code of the inputted hand-written Latin letter and the optimal Hidden Markov Models of each standard letter stored in a predetermined letter library and corresponding to each letter stored in the coarse classification candidate letter aggregation by using Viterbi Algorithm; (e.3) obtaining the maximum matching probability by sequencing each matching probability by using public Bubble Sort Algorithm; (e.4) determining the standard letter stored in the predetermined letter library and corresponding to the optimized matching probability as the final identifying result of Latin letter.

Comparing to the prior art, the present invention considers many hand-written styles of Latin letter, extract many stable characteristics of Latin letter of different hand-written styles, and classify the Latin letter aggregation each time with one characteristic, so that the whole standard Latin letter aggregation is classified into many small Latin letter aggregations with intersection to be the coarse classification candidate letter aggregations to be identified. When identifying the inputted hand-written Latin letter, obtain the coarse classification candidate letter aggregation that matches with the characteristics of the inputted hand-written Latin letter. Many stable characteristics ensure the identifying rate. The multi-layer coarse classification candidate letter aggregations regulate the searching path and increase the identifying speed.

BRIEF DESCRIPTION OF THE DRAWINGS

FIG. 4 is a schematic view of calculating a direction of hand-written Latin letter Lx, Ly.

FIG. 5a is a schematic view of determining a first value of the transverse density Lx FIG. 5b is a schematic view of determining a second value of the transverse density Lx FIG. 5c is a schematic view of determining a third value of the transverse density Lx FIG. 5d is schematic view of determining a fourth value of the transverse density Lx FIG. 5e is a schematic view of determining a fifth value of the transverse density Lx

DETAILED DESCRIPTION OF THE PREFERRED EMBODIMENT

Figure 1:
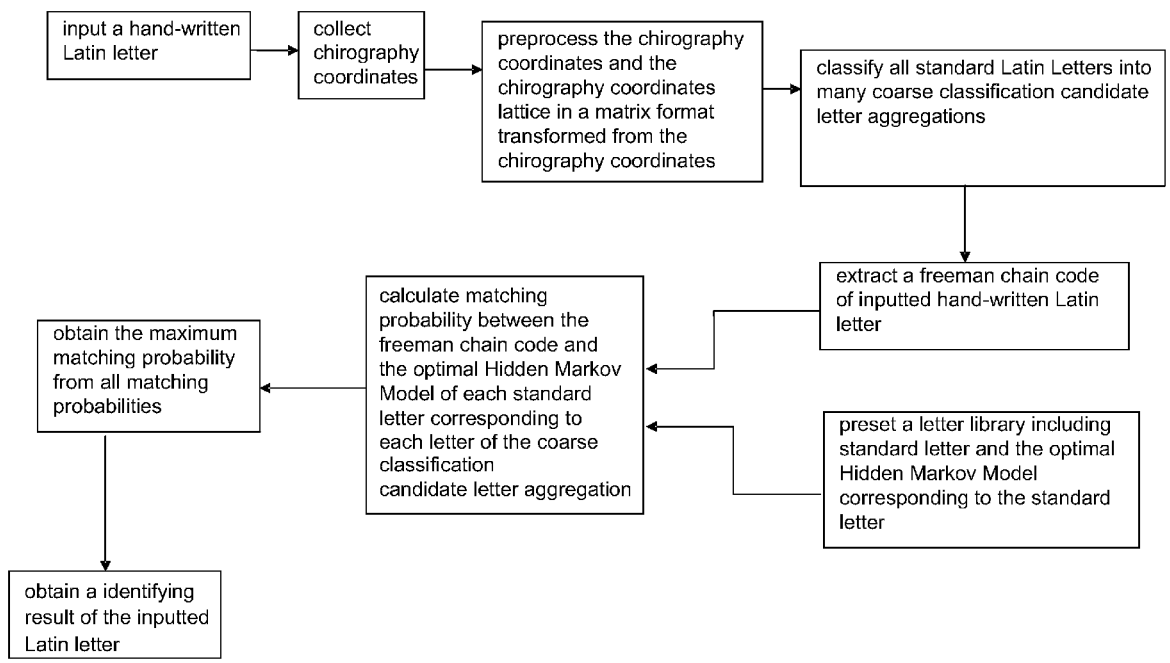
FIG. 1 is a flow chart of the present invention.

Referring to the drawings, the present invention is further described in detail as follows.

First, the standard Latin letter library pre-stored in a terminal unit is described.

The Latin letter library comprises 52 standard Latin letters and an optimal Hidden Markov Models corresponding to each standard Latin letter. The obtaining process of the optimal Hidden Markov Models comprises the following steps.

Figure 9:
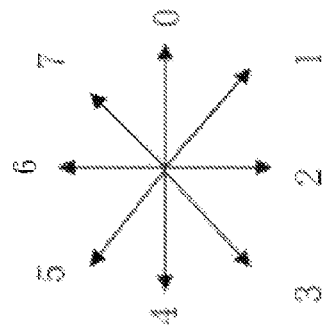
FIG. 9 is a schematic view illustrating the definition the eight-direction freeman chain code.

1) Write 52 Latin letters by hand for one hundred times, and obtain eight-direction direction code of the coordinate points passed by the chirography of each Latin letter according to the schematic view of the definition of eight-direction freeman chain code as shown in FIG. 9 according to hand-written chirography sequence of each time. The eight-direction direction code is the freeman chain code, and the freeman chain code has eight directions, 0, 1, 2, 3, 4, 5, 6 and 7. Thus, a string of freeman chain code is obtained by writing each Latin letter by hand each time, and one hundred strings of corresponding freeman chain codes can be obtained by writing one Latin letter by hand for one hundred times. The one hundred strings of the corresponding freeman chain codes of each Latin letter are taken as one hundred samples of Latin letter.

2) Input the samples into the primary Hidden Markov Models for being trained, so as to obtain the optimal Hidden Markov Models, which comprise the following steps. First, determine the state number L and the number of observed value G, and initialize the model parameters of the primary Hidden Markov Models in an equiprobability manner. Because the freeman chain code has eight values: 1, 2, 3, 4, 5, 6 and 7, G=8 and L=10 in the preferred embodiment. L generally is valued between 0 and 20. Theoretically, the higher L is, the more precise the optimal Hidden Markov Models is. However, too high value of L will not only increase the calculation complexity, but also demand a higher CPU of the terminal unit. Second, take the sample obtained in step 1) as the observed value sequence of the primary Hidden Markov Models, and optimize the model parameters of the primary Hidden Markov Model by using Baum-Welch Iterative Re-evaluation Algorithm, so as to finally obtain the optimal Hidden Markov Model.

The Baum-Welch Iterative Re-evaluation Algorithm of the step 2) is the local optimized algorithm based on the steepest gradient descent. It is very easy to obtain a local optimized solution while estimating the parameters, so that the Baum-Welch Iterative Re-evaluation Algorithm can not ensure to obtain a global maximal point. The convergent point may be a local maximal point. In order to obtain the global maximal point, optimize the model parameters of the primary Hidden Markov Model by using global optimized algorithm based on stochastic relaxation discrete Hidden Markov parameters, so as to finally obtain the optimal Hidden Markov Model.

Based on the standard Latin letter library, an identifying method of hand-written Latin letter of the present invention, as shown in FIG. 1, comprises the following steps.

(a) Collect the chirography coordinates of hand-written Latin letter (to be identified) that are inputted in a terminal unit, and store the collected chirography coordinates into a predefined structural array in real time. In this embodiment, the terminal unit can be mobile phone, PDA (Personal Digital Assistant), or other digital terminal products, wherein the terminal unit has an inputted frame with coordinates of 192×192 lattice.

(b) Preprocess the chirography coordinates and the chirography coordinates lattice in a matrix format transformed from the chirography coordinates stored in a structural array, the preprocessing process comprises the following steps.

(b.1) Smoothly filter the chirography coordinates stored in the structural array, remove hardware noise, and eliminate burr and broken line produced in writing process. In this embodiment, smoothly filtering, hardware noise removing and burr and broken line eliminating produced in writing process are processed by using prior art.

(b.2) Correct the local deformation of the hand-written letters by using linear normalization and non-linear normalization of on-line single-point width hand-written style, because the hand-written Latin letter has various deformation comparing to the standard Latin letter, which greatly effect the later process.

The algorithm linearly and nonlinearly normalizes the chirography coordinate point lattice in the matrix format transformed from the chirography coordinates processed in step (b.1), and obtains new chirography coordinate point lattice so as to correct the local deformation of the hand-written letters. The algorithm comprises the following steps.

(b.2.1) Linearly normalize the chirography coordinate point lattice in the matrix format transformed from the chirography coordinates process in step (b.1) to a 64×64 standard coordinate point lattice by adopting coordinates frame scaling and direct projection method so as to reduce the computation of the subsequent nonlinear normalization process and increase the feasibility of the nonlinear normalization process.

(b.2.2) Express the standard coordinate point of the standard coordinate point lattice as (x,y), and classify the standard coordinate point (x,y) into the chirography coordinate point and the non-chirography coordinate point. The non-chirography coordinate point is an area of no chirography. The existence of the chirography beside the non-chirography coordinate point comprises the following conditions. There is no chirography either on the left or right; there is chirography on the left and no chirography on the right; there is chirography on both the left and right. The chirography coordinate point is on the chirography. The existence of the chirography beside the chirography coordinate point comprises the following conditions: there is no chirography either on the left or right; there is chirography on the left and no chirography on the right; there is no chirography on the left and chirography on the right. One stroke is defined from the fall to the lift of the pen.

(b.2.3) Calculate the density function d(x,y) of the standard coordinate point (x,y), $$d(x, y) = \begin{cases} \text{Max}(A/Lx, A/Ly), & Lx + Ly \pi 6A \\ 0, & Lx + Ly \geq 6A \end{cases},$$

wherein, Lx is a transverse density of the current standard coordinate point, Ly is a vertical density of the current standard coordinate point, A is a length of the standard coordinate point lattice, and the value of A is 64.

(b.2.4) Calculate a level density projection function H(x) and a vertical density projection function V(y) of the standard coordinate point(x,y) according to the density function d(x,y) of the standard coordinate point (x,y)

$$H(x) = \sum_{y=1}^{J} [d(x, y) + a_H],$$

$$V(y) = \sum_{x=1}^{I} [d(x, y) + a_v],$$

wherein, d(x,y) is the density function of the standard coordinate point (x,y), I×J is a dimension of the standard coordinate point lattice, the value of I×J is 64×64, $a_H$ and $a_v$ are correction coefficient, and both value of $a_H$ and $a_v$ are 0.1. The theoretical value of correction coefficient $a_H$ and $a_v$ is [0, 1]. The dimension of the correction coefficient $a_H$ and $a_v$ relates to the correction effect of the local deformation of the hand-written letter. When both $a_H$ and $a_v$ are 0.1, 0.125, 0.2, 0.58 and 0.8 respectively, experiments shows that the correction effect of the local deformation of the hand-written letter is optimal when both $a_H$ and $a_v$ are 0.1.

(b.2.5) Non-linearly normalize the chirography coordinate point lattice by using the level density projection function H(x) and the vertical density projection function V(y) to obtain new chirography coordinate point lattice, $$m = \sum_{x=1}^{i} H(x) \times \frac{M}{\sum_{x=1}^{I} H(x)},$$

$$n = \sum_{y=1}^{j} V(y) \times \frac{N}{\sum_{y=1}^{J} V(y)},$$

wherein I×J is the dimension of the standard coordinate point lattice, the value of I×J is 64×64; M×N is a dimension of the new chirography coordinate point lattice processed by non-linear normalization, the predetermined value of M×N is 64×64; (m,n) is a coordinate point of the new chirography coordinate point lattice; i=1,2, . . . ,I , j=1,2, . . . ,J.

In this embodiment, the transverse density Lx and the vertical density Ly of the current standard coordinate point is obtained from the following method. As shown in FIG. 4, the beginning of Lx is on the right and the beginning of Ly is on the upside. Lx has three different values, when the current standard coordinate point is at a position shown in FIG. 5a and 5c, the value of Lx is the times of discrete chirography coordinate point passed by the horizontal line from the current standard coordinate point to the right +1. In this preferred embodiment, the times of the continuous chirography passed by the horizontal line to the right is taken as one time. When the current standard coordinate point is at the position shown in FIG. 5b, the value is 1. When the current standard coordinate point is at the position shown in FIG. 5e, the value is 2A. When the current standard coordinate point is non-chirography coordinate point, the value of Lx has tree different values. When the current standard coordinate point is at a position shown in FIG. 5a and 5c, the value of Lx is the times of discrete chirography coordinate point passed by the horizontal line from the current standard coordinate point to the right. When the current standard coordinate point is at the position shown in FIG. 5b, the value is 2A. When the current standard coordinate point is at the position shown in FIG. 5d, the value is 4A. Wherein A is a length of the standard coordinate point lattice, and the value of A is 64. The value process of the vertical density Ly is the same with that of the vertical density Lx. As shown in FIG. 5a to 5e, "1"represents the current standard coordinate point; "●" represents the point stroke.

(b.3) Add points to the new chirography coordinate point lattice processed by step (b.2) to prevent from loosing effective characteristic point. The adding operation adopts classical Bresenham Lineplotting Algorithm, and adds middle characteristic point between two adjacent standard coordinate points, when the distance of two adjacent standard coordinate point is larger than 1 in the new chirography coordinate point lattice.

(c) Make coarse classification candidate letter aggregation. Classify all standard Latin letters in different layers according to characteristics of many writing styles of each Latin letter, to obtain a coarse classification candidate letter aggregation matching with the inputted hand-written Latin letter. Different characteristics can be extracted from different styles of one Latin letter, so that one Latin letter may exist in different coarse classification candidate letter aggregations. The detailed process is illustrated as follows.

Figures 2A, 2B, 2C, 2D, 2E:
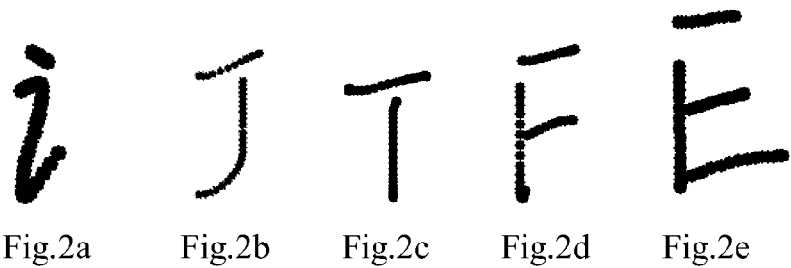
FIG. 2a is a schematic view of hand-written Latin letter with inherent up-down structure.
FIG. 2b is a first schematic view of hand-written Latin letter with up-down structure caused by hand writing.
FIG. 2c is a second schematic view of hand-written Latin letter with up-down structure caused by hand writing.
FIG. 2d is a third schematic view of hand-written Latin letter with up-down structure caused by hand writing.
FIG. 2e is a fourth schematic view of hand-written Latin letter with up-down structure caused by hand writing.

(c.1) First layer classification: classify all standard Latin letter into up-down structure coarse classification candidate letter aggregation and non-up-down structure coarse classification candidate letter aggregation, according to whether the hand-written Latin letter is up-down structure or not. The up-down structure coarse classification candidate letter aggregation includes standard Latin letters with inherent up-down structure during the hand-writing as shown in FIG. 2a, and standard Latin letters with up-down structure caused by the hand-writing as shown in FIGS. 2b, 2c, 2d, and 2e. Non-up-down structure coarse classification candidate letter aggregation includes the standard Latin letters without inherent up-down structure.

(c.2) Second layer classification: classify the up-down structure coarse classification candidate letter aggregation into transverse stroke coarse classification candidate letter aggregation and non-transverse stroke coarse classification candidate letter aggregation, according to whether the last stroke of the hand-written standard Latin letter is transverse stroke or not, and take these two coarse classification candidate letter aggregations as the coarse classification candidate letter aggregation that matches with the inputted hand-written Latin letter. The transverse stroke coarse classification candidate letter aggregation includes the hand-written standard Latin letters with inherent transverse last stroke and the hand-written standard Latin letters with transverse last stroke caused by the hand writing. The non-transverse stroke coarse classification candidate letter aggregation includes the hand-written standard Latin letters without inherent transverse last stroke.

Classify the non-up-down structure coarse classification candidate letter aggregation into the coarse classification candidate letter aggregations with H=1, 2, 3, and 4, according to the transverse cross number H during the hand writing.

(c.3) Third layer classification: classify the coarse classification candidate letter aggregation with H=1 into the coarse classification candidate letter aggregations with S=1, 2, 3, and 4, according to the vertical cross number S during the hand writing, and take these four coarse classification candidate letter aggregations as the coarse classification candidate letter aggregation that matches with the inputted hand-written Latin letter. Classify the coarse classification candidate letter aggregation with H=2 into the coarse classification candidate letter aggregations with UP=1, 2, and 3, according to the transverse cross number UP in the ⅓ upper portion of the Latin letter during the hand writing, and take the UP=2 and UP=3 coarse classification candidate letter aggregations as the coarse classification candidate letter aggregation that matches with the inputted hand-written Latin letter. Classify the coarse classification candidate letter aggregation with H=3 into the coarse classification candidate letter aggregations with Maxs=1, 2, and 3, according to the optimal vertical cross number Maxs during the hand writing, and take the Maxs=2 and Maxs=3 coarse classification candidate letter aggregations as the coarse classification candidate letter aggregation that matches with the inputted hand-written Latin letter. Classify the coarse classification candidate letter aggregation with H=4 into the coarse classification candidate letter aggregations with Down=1, 2, and 3, according to the transverse cross number Down in the lower ⅓ portion of the Latin letter during the hand writing, and take the Down=2 and Down=3 coarse classification candidate letter aggregations as the coarse classification candidate letter aggregation that matches with the inputted hand-written Latin letter.

Figure 3:
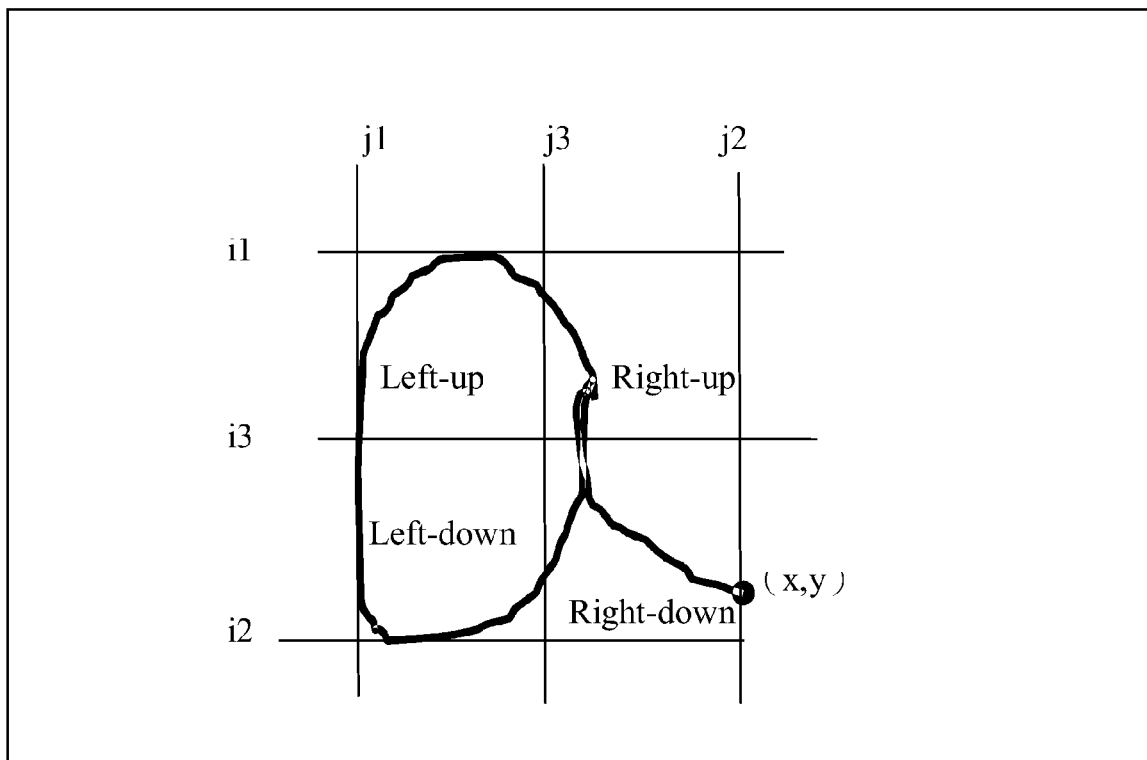
FIG. 3 is a schematic view of determining a position of the last new chirography coordinate point of the new chirography coordinate lattice in the inputted hand-written Latin letter.

(c.4) Fourth layer classification: classify the coarse classification candidate letter aggregation with UP=1 into the coarse classification candidate letter aggregations with S1=1, 2, and 3, according to the vertical cross number S1 during the hand writing; classify the coarse classification candidate letter aggregation with Maxs=1 into the coarse classification candidate letter aggregations with first right-up position, first left-down position, first left-down position and first right-down position, according to the position information of the last new chirography coordinate point of the new chirography coordinate lattice in the standard Latin letter during the hand writing, for example, as shown in FIG. 3, the last new chirography coordinate point falls into the right-down position; classify the coarse classification candidate letter aggregation with Down=1 into the coarse classification candidate letter aggregations with S2=1, 2, and 3, according to the vertical cross number S2 during the hand writing.

(c.5) Fifth layer classification: classify the coarse classification candidate letter aggregation with S1=1 into the coarse classification candidate letter aggregations with second right-up position, second left-down position, second left-down position and second right-down position, according to the position information of the last new chirography coordinate point of the new chirography coordinate lattice in the standard Latin letter during the hand writing; classify the coarse classification candidate letter aggregation with S1=2 into the coarse classification candidate letter aggregations with third right-up position, third left-down position, third left-down position and third right-down position, according to the position information of the last new chirography coordinate point of the new chirography coordinate lattice in the standard Latin letter during the hand writing; classify the coarse classification candidate letter aggregation with S1=3 into the coarse classification candidate letter aggregations with fourth right-up position, fourth left-down position, fourth left-down position and fourth right-down position, according to the position information of the last new chirography coordinate point of the new chirography coordinate lattice in the standard Latin letter during the hand writing; classify the coarse classification candidate letter aggregation with first left-up position into the coarse classification candidate letter aggregations with first left arch opening and first non-left arch opening, according to whether there is left arch opening during the hand writing, and take the two coarse classification candidate letter aggregations as the coarse classification candidate letter aggregation that matches with the inputted hand-written Latin letter; classify the coarse classification candidate letter aggregation with first left-down position, first right-up position and first right-down into the coarse classification candidate letter aggregations with second left arch opening and second non-left arch opening, third left arch opening and third non-left arch opening, fourth left arch opening and fourth non-left arch opening respectively, according to whether there is left arch opening during the hand writing; classify the coarse classification candidate letter aggregation with S2=1 into the coarse classification candidate letter aggregations with fifth right-up position, fifth left-down position, fifth left-down position and fifth right-down position, according to the position information of the last new chirography coordinate point of the new chirography coordinate lattice in the standard Latin letter during the hand writing; classify the coarse classification candidate letter aggregation with S2=2 into the coarse classification candidate letter aggregations with sixth right-up position, sixth left-down position, sixth left-down position and sixth right-down position, according to the position information of the last new chirography coordinate point of the new chirography coordinate lattice in the standard Latin letter during the hand writing; classify the coarse classification candidate letter aggregation with S2=3 into the coarse classification candidate letter aggregations with seventh right-up position, seventh left-down position, seventh left-down position and seventh right-down position, according to the position information of the last new chirography coordinate point of the new chirography coordinate lattice in the standard Latin letter during the hand writing.

(c.6) Sixth layer classification: classify the coarse classification candidate letter aggregation with second left-up position into the coarse classification candidate letter aggregations with fifth left arch opening and fifth non-left arch opening, according whether there is left arch opening or not during the hand writing, and take the two coarse classification candidate letter aggregations as the coarse classification candidate letter aggregation that matches with the inputted hand-written Latin letter; classify the coarse classification candidate letter aggregation with second left-down position, second right-up position and second right-down into the coarse classification candidate letter aggregations with sixth left arch opening and sixth non-left arch opening, seventh left arch opening and seventh non-left arch opening, eighth left arch opening and eighth non-left arch opening respectively, according to whether there is left arch opening during the hand writing; classify the coarse classification candidate letter aggregation with third left-up position into the coarse classification candidate letter aggregations with ninth left arch opening and ninth non-left arch opening, according whether there is left arch opening or not during the hand writing, and take the two coarse classification candidate letter aggregations as the coarse classification candidate letter aggregation that matches with the inputted hand-written Latin letter; classify the coarse classification candidate letter aggregation with third left-down position, third right-up position and third right-down into the coarse classification candidate letter aggregations with tenth left arch opening and tenth non-left arch opening, eleventh left arch opening and eleventh non-left arch opening, twelfth left arch opening and twelfth non-left arch opening respectively, according to whether there is left arch opening during the hand writing; classify the coarse classification candidate letter aggregation with fourth left-up position into the coarse classification candidate letter aggregations with thirteenth left arch opening and thirteenth non-left arch opening, according whether there is left arch opening or not during the hand writing, and take the two coarse classification candidate letter aggregations as the coarse classification candidate letter aggregation that matches with the inputted hand-written Latin letter; classify the coarse classification candidate letter aggregation with fourth left-down position, fourth right-up position and fourth right-down into the coarse classification candidate letter aggregations with fourteenth left arch opening and fourteenth non-left arch opening, fifteenth left arch opening and fifteenth non-left arch opening, sixteenth left arch opening and sixteenth non-left arch opening respectively, according to whether there is left arch opening during the hand writing; classify the coarse classification candidate letter aggregation with fifth left-up position into the coarse classification candidate letter aggregations with seventeenth left arch opening and seventeenth non-left arch opening, according whether there is left arch opening or not during the hand writing, and take the two coarse classification candidate letter aggregations as the coarse classification candidate letter aggregation that matches with the inputted hand-written Latin letter; classify the coarse classification candidate letter aggregation with fifth left-down position, fifth right-up position and fifth right-down into the coarse classification candidate letter aggregations with eighteenth left arch opening and eighteenth non-left arch opening, nineteenth left arch opening and nineteenth non-left arch opening, twentieth left arch opening and twentieth non-left arch opening respectively, according to whether there is left arch opening during the hand writing; classify the coarse classification candidate letter aggregation with sixth left-up position into the coarse classification candidate letter aggregations with twenty-first left arch opening and twenty-first non-left arch opening, according whether there is left arch opening or not during the hand writing, and take the two coarse classification candidate letter aggregations as the coarse classification candidate letter aggregation that matches with the inputted hand-written Latin letter; classify the coarse classification candidate letter aggregation with sixth left-down position, sixth right-up position and sixth right-down into the coarse classification candidate letter aggregations with twenty-second left arch opening and twenty-second non-left arch opening, twenty-third left arch opening and twenty-third non-left arch opening, twenty-fourth left arch opening and twenty-fourth non-left arch opening respectively, according to whether there is left arch opening during the hand writing; classify the coarse classification candidate letter aggregation with seventh left-up position into the coarse classification candidate letter aggregations with twenty-fifth left arch opening and twenty-fifth non-left arch opening, according whether there is left arch opening or not during the hand writing, and take the two coarse classification candidate letter aggregations as the coarse classification candidate letter aggregation that matches with the inputted hand-written Latin letter; classify the coarse classification candidate letter aggregation with seventh left-down position, seventh right-up position and seventh right-down into the coarse classification candidate letter aggregations with twenty-sixth left arch opening and twenty-sixth non-left arch opening, twenty-seventh left arch opening and twenty-seventh non-left arch opening, twenty-eighth left arch opening and twenty-eighth non-left arch opening respectively, according to whether there is left arch opening during the hand writing.

(d) According to the local characteristic of the inputted hand-written Latin letter, match the inputted hand-written Latin letter with the coarse classification candidate letter aggregation of each layer obtained in step (c), and obtain the coarse classification candidate letter aggregation matched with the inputted hand-written Latin letter as the steps illustrated as follows.

(d.1) Determine whether the inputted hand-written Latin letter is up-down structure. If the inputted hand-written Latin letter is up-down structure, determine whether the last stroke is transverse or not, wherein if the last stroke is transverse, directly determine that the coarse classification candidate letter aggregation matched with the inputted hand-written Latin letter is the transverse stroke coarse classification candidate letter aggregation; if the last stroke is not transverse, directly determine that the coarse classification candidate letter aggregation matched with the inputted hand-written Latin letter is the non-transverse stroke coarse classification candidate letter aggregation. If the inputted hand-written Latin letter is not up-down structure, carry out the following steps.

(d.2) Calculate the transverse cross number H. When the transverse cross number is 1, calculate the vertical cross number, and determine the coarse classification candidate letter aggregation that matched with inputted hand-written Latin letter is the coarse classification candidate letter aggregation with S=1, S=2, S=3 or S=4 according to different vertical cross number. When the transverse cross number is 2, calculate the transverse cross number UP in the ⅓ upper portion of the Latin letter., wherein when the transverse cross number in the ⅓ upper portion of the Latin letter is 2 or 3, directly determine that the coarse classification candidate letter aggregation matched with the inputted hand-written Latin letter is the coarse classification candidate letter aggregation with UP=2 or UP=3; when the transverse cross number in the ⅓ upper portion of the Latin letter is 1, calculate the vertical cross number of the hand-written Latin letter, and determine the coarse classification candidate letter aggregation that matched with inputted hand-written Latin letter according to the vertical cross number and the position information of the last new chirography coordinate point of the new chirography coordinate lattice in the standard Latin letter during the hand writing, and whether the left arch opening of the inputted Latin letter existing or not. When H=3, calculate the optimal vertical cross number of the inputted Latin letter, wherein when the optimal vertical cross number is 2 or 3, directly determine that the coarse classification candidate letter aggregation that matched with inputted hand-written Latin letter is the coarse classification candidate letter aggregation with Maxs=2 or Maxs=3; when the optimal vertical cross number is 1, determine the coarse classification candidate letter aggregation that matched with inputted hand-written Latin letter according to the position information of the last new chirography coordinate point of the new chirography coordinate lattice in the standard Latin letter during the hand writing, and whether the left arch opening of the inputted Latin letter existing or not. When H=4, calculate the transverse cross number Down in the ⅓ lower portion of the Latin letter, wherein when the transverse cross number in the ⅓ lower portion of the Latin letter is 2 or 3, directly determine that the coarse classification candidate letter aggregation matched with the inputted hand-written Latin letter is the coarse classification candidate letter aggregation with Down=2 or Down=3; when the transverse cross number in the ⅓ lower portion of the Latin letter is 1, calculate the vertical cross number of the hand-written Latin letter, and determine the coarse classification candidate letter aggregation that matched with inputted hand-written Latin letter according to the vertical cross number and the position information of the last new chirography coordinate point of the new chirography coordinate lattice in the standard Latin letter during the hand writing, and whether the left arch opening of the inputted Latin letter existing or not.

In step (d.1), the method of determining whether the inputted Latin letter is up-down structure or not comprises the following steps. (d.1.1) Scan the new chirography coordinate lattice row by row from top to bottom, wherein when meet with the first new chirography coordinate point, set the row value to the current row under scanning, and define the row value as the top boundary of the letter, and scan the new chirography coordinate lattice row by row from bottom to top, wherein when meet with the first new chirography coordinate point, set the row value to the current row under scanning, and define the row value as the bottom boundary of the letter. (d.1.2) Scan from the top boundary to the bottom boundary, record the number of the blank row where there is not new chirography coordinate point during the scanning, wherein when the number of the blank row equals to or is larger than 3 and next row of the last blank row of continuous blank rows is not blank, determine the inputted Latin latter is up-down structure.

In step (d.2), the calculation of the transverse cross number of the inputted hand-written Latin latter comprises the following steps. (d.2.1a) Scan each row of the new chirography coordinate lattice transversely, and record the times of non new chirography coordinate point changing to new chirography coordinate point, wherein the changing times is the initial transverse cross number. (d.2.2a) Compare the initial transverse cross number of each row in the new chirography coordinate lattice, and finding out the largest transverse cross number of the initial transverse cross numbers as the final transverse cross number of the letter. In step (d.2), the calculation of the vertical cross number of the inputted hand-written Latin latter comprises the following steps. (d.2.1b) Scan each row of the new chirography coordinate lattice vertically, and record the times of non new chirography coordinate point changing to new chirography coordinate point, wherein the changing times is the initial vertical cross number. (d.2.2b) Compare the initial vertical cross number of each row in the new chirography coordinate lattice, finding out all the initial vertical cross numbers that equals to 3 or is larger than 3, and finding out the largest vertical cross number of the initial vertical cross numbers as the final vertical cross number of the letter. In step (d.2), the calculation of the transverse cross number in the ⅓ upper portion and ⅓ lower portion of the hand-written Latin letter comprises the following steps. (d.2.1c) Scan the new chirography coordinate lattice row by row from top to bottom, wherein when meet with the first new chirography coordinate point, set the row value to the current row under scanning, and define the row value as the top boundary of the letter i1, and scan the new chirography coordinate lattice row by row from bottom to top, wherein when meet with the first new chirography coordinate point, set the row value to the current row under scanning, and define the row value as the bottom boundary of the letter i2. (d.1.2c) Calculate the ⅓ upper portion boundary i3, wherein i3=i1+⅓(i2−i1), and take the rows between the top boundary i1 and the ⅓ upper portion boundary i3 as the ⅓ upper portion of the Latin letter; calculate the ⅓ lower portion boundary i4, wherein i4=i1+⅔(i2−i1), and take the rows between the bottom boundary i2 and the ⅓ lower portion boundary i4 as the ⅓ lower portion of the Latin letter. (d.1.3c) According to the calculation process of the transverse cross number of whole Latin letter, obtain the initial transverse cross number of each row from the top boundary i1 to the upper boundary row i3, find out all the initial transverse cross numbers that equals to 3 or is larger than 3, and find out the largest transverse cross number of the initial transverse cross numbers as the final transverse cross number in the ⅓ upper portion of the letter; obtain the transverse cross number in the ⅓ lower portion of the letter in the similar process mentioned above. In step (d.2), the calculation of the optimal vertical cross number of the inputted hand-written Latin letter comprises the following step. (d.2.1d) During the calculation process of the vertical cross number of each row in the new chirography coordinate lattice, calculate the times of each initial vertical cross number, and take the most frequently times as the optimal vertical cross number.

In step (d.2), the determining process of the position of the last new chirography coordinate point in the new chirography coordinate lattice comprises the following steps illustrated with FIG. 3. (d.2.1e) Scan the new chirography coordinate lattice row by row from top to bottom, wherein when meet with the first new chirography coordinate point, set the row value to the current row under scanning, and define the row value as the top boundary of the letter i1, and scan the new chirography coordinate lattice row by row from bottom to top, wherein when meet with the first new chirography coordinate point, set the row value to the current row under scanning, and define the row value as the bottom boundary of the letter i2; Scan the new chirography coordinate lattice row by row from left to right, wherein when meet with the first new chirography coordinate point, set the row value to the current row under scanning, and define the row value as the left boundary of the letter j1, and scan the new chirography coordinate lattice row by row from right to left, wherein when meet with the first new chirography coordinate point, set the row value to the current row under scanning, and define the row value as the right boundary of the letter j2, wherein the top boundary i1, bottom boundary i2, left boundary j1, and the right boundary j2 constitute the smallest outer rectangle frame of the hand-written Latin letter. (d.2.2e) Divide the smallest outer rectangle frame evenly into a left-up rectangle frame, a left-down rectangle frame, a right-up rectangle frame, a right-down rectangle frame. (d.2.3e) Determine that the last new chirography coordinate point falls into the left-up rectangle frame, the left-down rectangle frame, the right-up rectangle frame or the right-down rectangle frame, wherein when the last new chirography coordinate point falls into the left-up rectangle frame, the last new chirography coordinate point is in the left-up position of the inputted hand-written Latin letter; when the last new chirography coordinate point falls into the left-down rectangle frame, the last new chirography coordinate point is in the left-down position of the inputted hand-written Latin letter; when the last new chirography coordinate point falls into the right-up rectangle frame, the last new chirography coordinate point is in the right-up position of the inputted hand-written Latin letter; when the last new chirography coordinate point falls into the right-down rectangle frame, the last new chirography coordinate point is in the right-down position of the inputted hand-written Latin letter.

Figure 6:
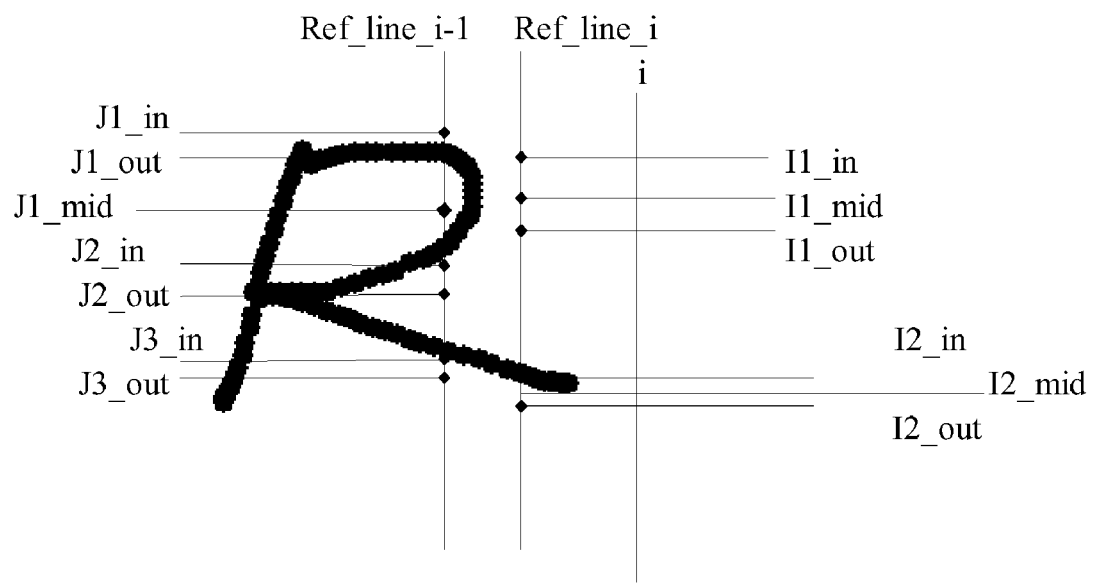
FIG. 6 is a schematic view of a hand-written Latin letter with a left arch opening.
Figure 7:
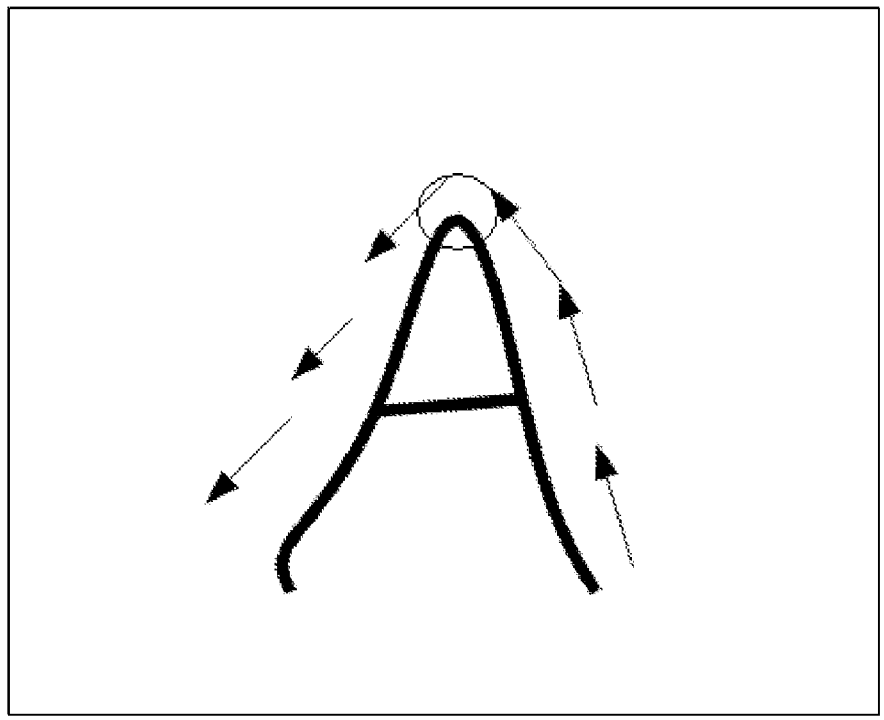
FIG. 7 is a schematic view of chirography of a hand-written Latin letter.
Figure 8:
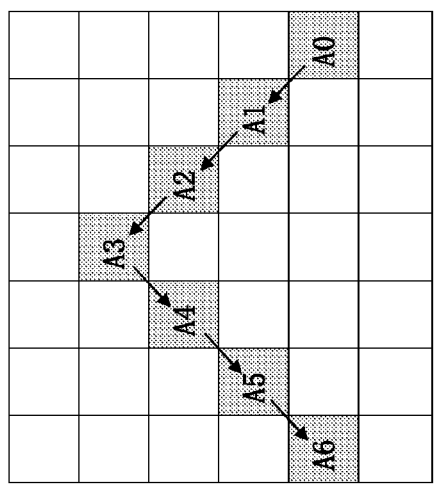
FIG. 8 is a schematic view of obtaining freeman chain code in the circled part of FIG. 7.

In step (d.2), the determining process of whether left arch opening existing in the hand-written Latin letter or not comprises the following steps. (d.2.1f) Calculate the initial vertical cross number of each column in the new chirography coordinate lattice. (d.2.2f) Scan from the right column to the left column, find out the first column whose the initial vertical cross number is not 0, and record the column as k. (d.2.3f) When the initial vertical cross number of the (k−1)th column is larger than the initial vertical cross number of the kth column, define the kth column as the reference column; when the initial vertical cross number of the (k−1)th column is smaller than the initial vertical cross number of the kth column, stop scanning and determine that there is no left arch opening in this letter; when the initial vertical cross number of the (k−1)th column equals to the initial vertical cross number of the kth column, keep scanning to the left until the initial vertical cross number of the (k−1)th column does not equal to the initial vertical cross number of the kth column, and define the scanned column as the reference column. As shown in FIG. 6, the initial vertical cross number of ith column is 1, and the vertical cross number of (i−1)th column is also 1, so keep scanning to the left until the two initial vertical cross numbers are different, and define the scanned column as the reference column which marked as Ref_line_i. (d.2.4f) As shown in FIG. 6, when the reference column is determined, record the vertical ordinate of the mth in-through point Im_in on the scanned reference column, that is the row ordinate of the in-through point Im_in in the new chirography coordinate lattice, record the vertical ordinate of the mth out-through point Im_out, that is the row ordinate of the out-through point Im_out in the new chirography coordinate lattice, record the vertical ordinate of the nth in-through point Jn in on the scan line of the left column Ref_line_i−1 of next reference column, that is the row ordinate of the in-through point Jn_in in the new chirography coordinate lattice, and record the vertical ordinate of the nth out-through point Jn_out on the scan line of the left column Ref_line_i−1 of next reference column, that is the row ordinate of the out-through point Jn_out in the new chirography coordinate lattice, wherein m=1, 2, . . . M, n=1,2, . . . N, M is the total number of the in-through point and out-through point of the scan line of the reference column, and N is the total number of the in-through point and out-through point of the scan line of the left column to the reference column. As shown in FIG. 6, M=2; N=3. (d.2.5f) Find out the middle point Im_mid between each couple of matched the in-through point Im_in and the out-thought point Im_out on the scan line of the reference column. (d.2.6f) Calculate the first straight distance between the each middle point Im_mid and the nth in-through point Jn_in, and find out the in-through point on the scan line of the left column to the reference column that satisfy the first straight distance is less than or equals to 2; calculate the second straight distance between the each middle point Im_mid and the nth in-through point Jn_out, and find out the out-through point on the scan line of the left column to the reference column that satisfy the second straight distance is less than or equals to 2, wherein n=1,2, . . . N, and N is the total number of the in-through point and out-through point of the scan line of the left column to the reference column. (d.2.7f) Calculate the middle point between the pth in-through point on the scan line of the left column to the reference column that satisfy the first straight distance is less than or equals to 2 and the pth out-through point on the scan line of the left column to the reference column that satisfy the first straight distance is less than or equals to 2, and determine whether a point of same row with one of the calculated middle points on the scan line of the reference column is 0 or not, wherein when the point of same row with one of the calculated middle points on the scan line of the reference column is not 0, determine that there is left arch opening in the inputted handwritten Latin letter; when the point of same row with one of the calculated middle points on the scan line of the reference column is 0, determine that there is no left arch opening in the inputted handwritten Latin letter. As shown in FIG. 6, there are two middle points on the reference column Ref_line_i, which are I1_mid and I2_mid. By calculating the first straight distance between each in-through point on the scan line of the left column to the reference column and I1_mind and the second straight distance between each out-through point on the scan line of the left column to the reference column and I1_mid, wherein the first in-through point that satisfy the above-mentioned requirement is the original second in-through point J2_in, and the first out-through point that satisfy the above-mentioned requirement is the original first in-through point J1_out, calculate the middle point J1_mid between the first in-through point and the first out-through point that satisfy the above-mentioned requirement; by calculating the first straight distance between each in-through point on the scan line of the left column to the reference column and I2_mid and the second straight distance between each out-through point on the scan line of the left column to the reference column and I2_mind, wherein the second in-through point that satisfy the above-mentioned requirement is the original third in-through point J3_in, and the second out-through point that satisfy the above-mentioned requirement is the original third in-through point J3_out, calculate the middle point J2_mid between the second in-through point and the second out-through point that satisfy the above-mentioned requirement. Determine whether a point of same row with the calculated middle point J1_mid or J2_mid on the scan line of the reference column is 0 or not. As shown in FIG. 6, the point of same row with the calculated middle point J1_mid on the scan line of the reference column is not 0, and the point of same row with the calculated middle point J2_mid on the scan line of the reference column is 0, so that only one middle point J1_mid satisfy the requirement, and it can be determined that there is left arch opening in the inputted hand-written letter. If both the middle points are 0, it can be determined that there is no left arch opening in the inputted hand-written letter. p=1, 2 . . . P, when the total number of the in-through points on the scan line on the left column to the reference column that satisfy the first straight distance is less than or equals to 2 is less than the total number of the out-through points on the scan line on the left column to the reference column that satisfy the second straight distance is less than or equals to 2, P is the total number of the in-through points on the scan line on the left column to the reference column that satisfy the first straight distance is less than or equals to 2; when the total number of the in-through points on the scan line on the left column to the reference column that satisfy the first straight distance is less than or equals to 2 is more than the total number of the out-through points on the scan line on the left column to the reference column that satisfy the second straight distance is less than or equals to 2, P is the total number of the out-through points on the scan line on the left column to the reference column that satisfy the second straight distance is less than or equals to 2. In the preferred embodiment, the "through" in the in-through point and out-through point means the change of point in the lattice, wherein the lattice is also matrix, and the point is the element of the matrix. The element is 0 represents there is no chirography, and the element is not 0 represents there is no chirography. If the elements in one column or one row in the lattice is 0 or not 0, there is no in-through or out-through; if the element in one column or one row changes, there is in-through or out-through. Considering from high dimension to low dimension, if there is non-0 element between the two 0 element in one column or one row, the 0 element in the smallest column or row number is the in-through point, and the 0 element in the largest column or row number is the out-through point.

(e) Extract a freeman chain code of inputted hand-written Latin letter, calculate a matching probability between the freeman chain code of the inputted hand-written Latin letter and the optimal Hidden Markov Model of each standard letter stored in a predetermined letter library and corresponding to each letter stored in the coarse classification candidate letter aggregation matched with the inputted hand-written Latin letter, obtain an optimized matching probability from each matching probability, and determine that the standard letter stored in the predetermined letter library and corresponding to the optimized matching probability as the final identifying result of inputted hand-written Latin letter. Step (e) comprises the following steps. (e.1) extract the freeman chain code of the inputted hand-written Latin letter; (e.2) calculate the matching probability between the freeman chain code of the inputted hand-written Latin letter and the optimal Hidden Markov Models of each standard letter stored in a predetermined letter library and corresponding to each letter stored in the coarse classification candidate letter aggregation by using Viterbi Algorithm; (e.3) obtain the maximum matching probability by sequencing each matching probability by using public Bubble Sort Algorithm; (e.4) determine the standard letter stored in the predetermined letter library and corresponding to the optimized matching probability as the final identifying result of Latin letter. The Viterbi Algorithm is used to calculate the matching probability of optimized matching path. The application of the Viterbi Algorithm greatly reduces the calculation speed and increases the matching speed of the inputted hand-written Latin letter.

The process of obtaining the freeman chain code of the inputted hand-written Latin letter comprises the following steps. Define the new chirography coordinate point representing the beginning of first stroke of the inputted hand-written Latin letter as a trace point in the new chirography coordinate point lattice. Determine the value of the trace point according to the eight-direction definition of the freeman chain code. Process the next new chirography coordinate point as the trace point according to the hand-written sequence of the inputted hand-written Latin letter, and obtain the freeman chain code of the inputted hand-written Latin letter, until the last new chirography coordinate point is processed,. The eight-direction definition of the freeman chain code is shown in FIG. 9, the freeman chain code has eight values, 0, 1, 2, 3, 4, 5, 6 and 7.

Figure 10A:
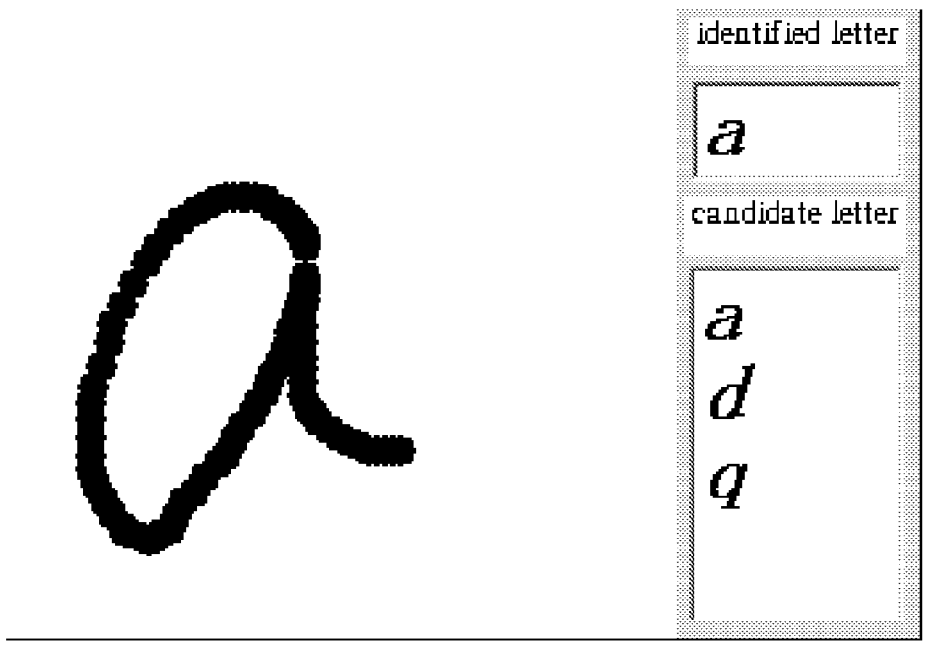
FIG. 10a is a schematic view illustrating an identifying result of an inputted hand-written Latin letter by using identifying method of the present invention.
Figure 10B:
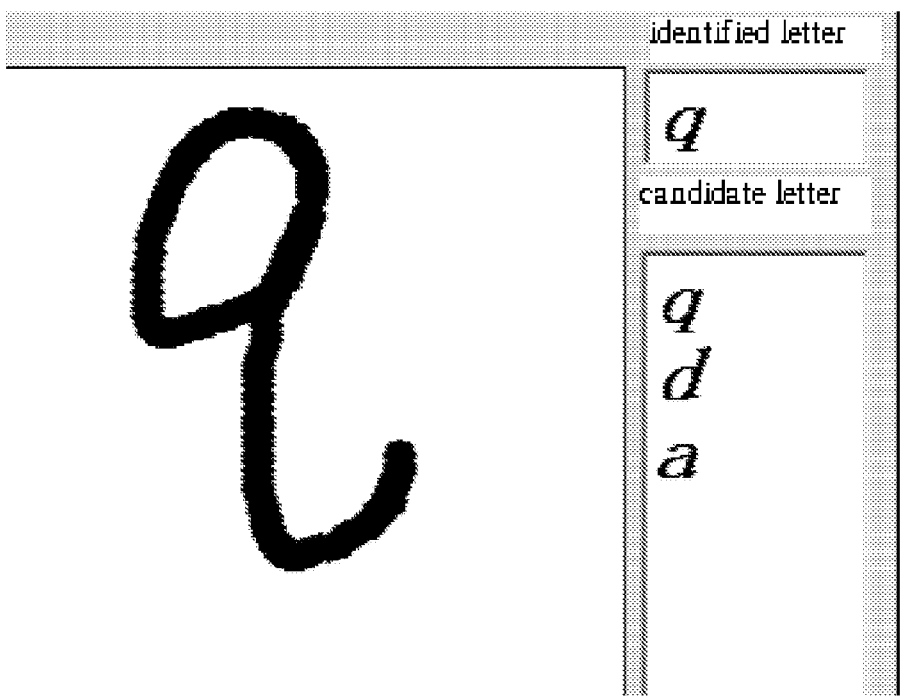
FIG. 10b is a schematic view illustrating an identifying result of another inputted hand-written Latin letter by using identifying method of the present invention.

By identifying two hand-written Latin letters according to the identifying method of the present invention, the identifying results are respectively shown in FIG. 10*a* and FIG. 10*b*. The left letter represents the inputted hand-written Latin letter; the right lower letters represent the coarse classification candidate letter aggregation obtained from the multilayer coarse classification algorithm based on the local characteristic of Latin letter; the right upper letter represents the final identifying result. The identifying precision of the present invention is high, as shown in FIG. 10*a* and FIG. 10*b*.

In the preferred embodiment, the determination of the up-down structure, the calculation of the transverse cross number, the calculation of the vertical cross number, and the determination of the position of the last stroke in the letter use the process illustrated in step (d.1) and (d.2).

What is claimed is:

1. An identifying method of hand-written Latin letter, comprising steps of:
   (a) collecting chirography coordinates of hand-written Latin letter that are inputted in a terminal unit, and storing said chirography coordinates into a predefined structural array in real time;
   (b) obtaining new chirography coordinate lattice by preprocessing chirography coordinates and chirography coordinates lattice in a matrix format transformed from said chirography coordinates stored in a structural array;
   (c) Classifying all standard Latin letters in different layers according to characteristics of each Latin letter during the hand writing, to obtain a coarse classification candidate letter aggregation matching with the inputted hand-written Latin letter, wherein step (c) comprises steps of:
   (c.1) classifying all standard Latin letter into up-down structure coarse classification candidate letter aggregation and non-up-down structure coarse classification candidate letter aggregation, according to whether the hand-written Latin letter is up-down structure or not, wherein the up-down structure coarse classification candidate letter aggregation includes standard Latin letters with inherent up-down structure during the hand-writing and standard Latin letters with up-down structure caused by the hand-writing, and the non-up-down structure coarse classification candidate letter aggregation includes the standard Latin letters without inherent up-down structure;

(c.2) classifying the up-down structure coarse classification candidate letter aggregation into transverse stroke coarse classification candidate letter aggregation and non-transverse stroke coarse classification candidate letter aggregation, according to whether the last stroke of the hand-written standard Latin letter is transverse stroke or not, and take these two coarse classification candidate letter aggregations as the coarse classification candidate letter aggregation that matches with the inputted hand-written Latin letter, wherein the transverse stroke coarse classification candidate letter aggregation includes the hand-written standard Latin letters with inherent transverse last stroke and the hand-written standard Latin letters with transverse last stroke caused by the hand writing; the non-transverse stroke coarse classification candidate letter aggregation includes the hand-written standard Latin letters without inherent transverse last stroke; classifying the non-up-down structure coarse classification candidate letter aggregation into the coarse classification candidate letter aggregations with H=1, 2, 3, and 4, according to the transverse cross number H during the hand writing;

(c.3) classifying the coarse classification candidate letter aggregation with H=1 into the coarse classification candidate letter aggregations with S=1, 2, 3, and 4, according to the vertical cross number S during the hand writing, and take these four coarse classification candidate letter aggregations as the coarse classification candidate letter aggregation that matches with the inputted hand-written Latin letter; classifying the coarse classification candidate letter aggregation with H=2 into the coarse classification candidate letter aggregations with UP=1, 2, and 3, according to the transverse cross number UP in the ⅓ upper portion of the Latin letter during the hand writing, and take the UP=2 and UP=3 coarse classification candidate letter aggregations as the coarse classification candidate letter aggregation that matches with the inputted hand-written Latin letter; classifying the coarse classification candidate letter aggregation with H=3 into the coarse classification candidate letter aggregations with Maxs=1, 2, and 3, according to the optimal vertical cross number Maxs during the hand writing, and take the Maxs=2 and Maxs=3 coarse classification candidate letter aggregations as the coarse classification candidate letter aggregation that matches with the inputted hand-written Latin letter; classifying the coarse classification candidate letter aggregation with H=4 into the coarse classification candidate letter aggregations with Down=1, 2, and 3, according to the transverse cross number Down in the lower ⅓ portion of the Latin letter during the hand writing, and take the Down=2 and Down=3 coarse classification candidate letter aggregations as the coarse classification candidate letter aggregation that matches with the inputted hand-written Latin letter;

(c.4) classifying the coarse classification candidate letter aggregation with UP=1 into the coarse classification candidate letter aggregations with S1=1, 2, and 3, according to the vertical cross number S1 during the hand writing; classifying the coarse classification candidate letter aggregation with Maxs=1 into the coarse classification candidate letter aggregations with first right-up position, first left-down position, first left-down position and first right-down position, according to the position information of the last new chirography coordinate point of the new chirography coordinate lattice in the standard Latin letter during the hand writing; classifying the coarse classification candidate letter aggregation with Down=1 into the coarse classification candidate letter aggregations with S2=1, 2, and 3, according to the vertical cross number S2 during the hand writing;

(c.5) classifying the coarse classification candidate letter aggregation with S1=1 into the coarse classification candidate letter aggregations with second right-up position, second left-down position, second left-down position and second right-down position, according to the position information of the last new chirography coordinate point of the new chirography coordinate lattice in the standard Latin letter during the hand writing; classifying the coarse classification candidate letter aggregation with S1=2 into the coarse classification candidate letter aggregations with third right-up position, third left-down position, third left-down position and third right-down position, according to the position information of the last new chirography coordinate point of the new chirography coordinate lattice in the standard Latin letter during the hand writing; classifying the coarse classification candidate letter aggregation with S1=3 into the coarse classification candidate letter aggregations with fourth right-up position, fourth left-down position, fourth left-down position and fourth right-down position, according to the position information of the last new chirography coordinate point of the new chirography coordinate lattice in the standard Latin letter during the hand writing; classifying the coarse classification candidate letter aggregation with first left-up position into the coarse classification candidate letter aggregations with first left arch opening and first non-left arch opening, according to whether there is left arch opening during the hand writing, and take the two coarse classification candidate letter aggregations as the coarse classification candidate letter aggregation that matches with the inputted hand-written Latin letter; classifying the coarse classification candidate letter aggregation with first left-down position, first right-up position and first right-down into the coarse classification candidate letter aggregations with second left arch opening and second non-left arch opening, third left arch opening and third non-left arch opening, fourth left arch opening and fourth non-left arch opening respectively, according to whether there is left arch opening during the hand writing; classifying the coarse classification candidate letter aggregation with S2=1 into the coarse classification candidate letter aggregations with fifth right-up position, fifth left-down position, fifth left-down position and fifth right-down position, according to the position information of the last new chirography coordinate point of the new chirography coordinate lattice in the standard Latin letter during the hand writing; classifying the coarse classification candidate letter aggregation with S2=2 into the coarse classification candidate letter aggregations with sixth right-up position, sixth left-down position, sixth left-down position and sixth right-down position, according to the position information of the last new chirography coordinate point of the new chirography coordinate lattice in the standard Latin letter during the hand writing; classifying the coarse classification candidate letter aggregation with S2=3 into the coarse classification candidate letter aggregations with seventh right-up position, seventh left-down position, seventh left-down position and seventh right-down position, according to the position information of the last new chirography coordinate point of the new chirography coordinate lattice in the standard Latin letter during the hand writing;

(c.6) classifying the coarse classification candidate letter aggregation with second left-up position into the coarse classification candidate letter aggregations with fifth left arch opening and fifth non-left arch opening, according whether there is left arch opening or not during the hand writing, and take the two coarse classification candidate letter aggregations as the coarse classification candidate letter aggregation that matches with the inputted hand-written Latin letter; classifying the coarse classification candidate letter aggregation with second left-down position, second right-up position and second right-down into the coarse classification candidate letter aggregations with sixth left arch opening and sixth non-left arch opening, seventh left arch opening and seventh non-left arch opening, eighth left arch opening and eighth non-left arch opening respectively, according to whether there is left arch opening during the hand writing; classifying the coarse classification candidate letter aggregation with third left-up position into the coarse classification candidate letter aggregations with ninth left arch opening and ninth non-left arch opening, according whether there is left arch opening or not during the hand writing, and take the two coarse classification candidate letter aggregations as the coarse classification candidate letter aggregation that matches with the inputted hand-written Latin letter; classifying the coarse classification candidate letter aggregation with third left-down position, third right-up position and third right-down into the coarse classification candidate letter aggregations with tenth left arch opening and tenth non-left arch opening, eleventh left arch opening and eleventh non-left arch opening, twelfth left arch opening and twelfth non-left arch opening respectively, according to whether there is left arch opening during the hand writing; classifying the coarse classification candidate letter aggregation with fourth left-up position into the coarse classification candidate letter aggregations with thirteenth left arch opening and thirteenth non-left arch opening, according whether there is left arch opening or not during the hand writing, and take the two coarse classification candidate letter aggregations as the coarse classification candidate letter aggregation that matches with the inputted hand-written Latin letter; classifying the coarse classification candidate letter aggregation with fourth left-down position, fourth right-up position and fourth right-down into the coarse classification candidate letter aggregations with fourteenth left arch opening and fourteenth non-left arch opening, fifteenth left arch opening and fifteenth non-left arch opening, sixteenth left arch opening and sixteenth non-left arch opening respectively, according to whether there is left arch opening during the hand writing; classifying the coarse classification candidate letter aggregation with fifth left-up position into the coarse classification candidate letter aggregations with seventeenth left arch opening and seventeenth non-left arch opening, according whether there is left arch opening or not during the hand writing, and take the two coarse classification candidate letter aggregations as the coarse classification candidate letter aggregation that matches with the inputted hand-written Latin letter; classifying the coarse classification candidate letter aggregation with fifth left-down position, fifth right-up position and fifth right-down into the coarse classification candidate letter aggregations with eighteenth left arch opening and eighteenth non-left arch opening, nineteenth left arch opening and nineteenth non-left arch opening, twentieth left arch opening and twentieth non-left arch opening respectively, according to whether there is left arch opening during the hand writing; classifying the coarse classification candidate letter aggregation with sixth left-up position into the coarse classification candidate letter aggregations with twenty-first left arch opening and twenty-first non-left arch opening, according whether there is left arch opening or not during the hand writing, and take the two coarse classification candidate letter aggregations as the coarse classification candidate letter aggregation that matches with the inputted hand-written Latin letter; classifying the coarse classification candidate letter aggregation with sixth left-down position, sixth right-up position and sixth right-down into the coarse classification candidate letter aggregations with twenty-second left arch opening and twenty-second non-left arch opening, twenty-third left arch opening and twenty-third non-left arch opening, twenty-fourth left arch opening and twenty-fourth non-left arch opening respectively, according to whether there is left arch opening during the hand writing; classifying the coarse classification candidate letter aggregation with seventh left-up position into the coarse classification candidate letter aggregations with twenty-fifth left arch opening and twenty-fifth non-left arch opening, according whether there is left arch opening or not during the hand writing, and take the two coarse classification candidate letter aggregations as the coarse classification candidate letter aggregation that matches with the inputted hand-written Latin letter; classifying the coarse classification candidate letter aggregation with seventh left-down position, seventh right-up position and seventh right-down into the coarse classification candidate letter aggregations with twenty-sixth left arch opening and twenty-sixth non-left arch opening, twenty-seventh left arch opening and twenty-seventh non-left arch opening, twenty-eighth left arch opening and twenty-eighth non-left arch opening respectively, according to whether there is left arch opening during the hand writing;

(d) according to the local characteristic of the inputted hand-written Latin letter, matching the inputted hand-written Latin letter with the coarse classification candidate letter aggregation of each aggregation obtained in step (c), and obtain the coarse classification candidate letter aggregation matched with the inputted hand-written Latin letter;

(e) extracting a freeman chain code of inputted hand-written Latin letter; calculating a matching probability between the freeman chain code of the inputted hand-written Latin letter and the optimal Hidden Markov Model of each standard letter stored in a predetermined letter library and corresponding to each letter stored in the coarse classification candidate letter aggregation matched with the inputted hand-written Latin letter; obtaining an optimized matching probability from each matching probability; determining that the standard letter stored in the predetermined letter library and corresponding to the optimized matching probability as the final identifying result of inputted hand-written Latin letter.

2. The identifying method of hand-written Latin letter, as recited in claim 1, wherein step (b) comprises the following steps of:

(b.1) smoothly filtering said chirography coordinates stored in the structural array, removing hardware noise, and eliminating burr and broken line formed in writing process;

(b.2) linearly and nonlinearly normalizing said chirography coordinate point lattice in the matrix format transformed from said chirography coordinates processed in step (b.1) by using linear normalization and non-linear normalization algorithm of on-line single-point width hand-written style to obtain new chirography coordinate point lattice; and (b.3) adding points to said new chirography coordinate point lattice processed by step (b.2) to prevent from loosing effective characteristic point.

3. The identifying method of hand-written Latin letter, as recited in claim 2, wherein step (b.2) comprises steps of:

(b.2.1) linearly normalizing said chirography coordinate point lattice in the matrix format transformed from said chirography coordinates processed in step (b.1) to a standard coordinate point lattice by adopting coordinates frame scaling and direct projection method;

(b.2.2) expressing standard coordinate point of standard coordinate point lattice as (x,y), and classifying said standard coordinate point (x,y) into a chirography coordinate point and a non-chirography coordinate point;

(b.2.3) calculating a density function d(x,y) of said standard coordinate point (x,y), $$d(x, y) = \begin{cases} \text{Max}(A/Lx, A/Ly), & Lx + Ly \pi 6A \\ 0, & Lx + Ly \geq 6A \end{cases},$$

wherein, Lx is a transverse density of a current standard coordinate point, Ly is a vertical density of a current standard coordinate point, A is a length of said standard coordinate point lattice, and a value of A is 64;

(b.2.4) calculating a level density projection function H(x) and a vertical density projection function V(y) of said standard coordinate point (x,y) according to said density function d(x,y) of said standard coordinate point (x,y), $$H(x) = \sum_{y=1}^{J} [d(x, y) + a_H],$$

$$V(y) = \sum_{x=1}^{I} [d(x, y) + a_v],$$

wherein, d(x,y) is said density function of said standard coordinate point (x,y), I×J is a dimension of said standard coordinate point lattice, a value of I×J is 64×64, $a_H$ and $a_v$ are correction coefficient, and both value of $a_H$ and $a_v$ are 0.1; and (b.2.5) non-linearly normalizing said chirography coordinate point lattice by using a level density projection function H(x) and a vertical density projection function V(y) to obtain a new chirography coordinate point lattice, $$m = \sum_{x=1}^{i} H(x) \times \frac{M}{\sum_{x=1}^{I} H(x)},$$

$$n = \sum_{y=1}^{j} V(y) \times \frac{N}{\sum_{y=1}^{J} V(y)},$$

wherein I×J is the dimension of said standard coordinate point lattice, the value of I×J is 64×64; M×N is a dimension of said new chirography coordinate point lattice processed by non-linear normalization algorithm, a predetermined value of M×N is 64×64; (m,n) is a coordinate point of said new chirography coordinate point lattice; i=1,2, . . . , I , j=1,2, . . . , J.

4. The identifying method of hand-written Latin letter, as recited in claim 1, wherein step (d) comprises steps of:

(d.1) determining whether the inputted hand-written Latin letter is up-down structure, wherein if the inputted hand-written Latin letter is up-down structure, determine whether the last stroke is transverse or not, wherein if the last stroke is transverse, directly determine that the coarse classification candidate letter aggregation matched with the inputted hand-written Latin letter is the transverse stroke coarse classification candidate letter aggregation; if the last stroke is not transverse, directly determine that the coarse classification candidate letter aggregation matched with the inputted hand-written Latin letter is the non-transverse stroke coarse classification candidate letter aggregation; if the inputted hand-written Latin letter is not up-down structure, carry out the following step;

(d.2) calculating the transverse cross number H, wherein when the transverse cross number is 1, calculate the vertical cross number, and determine the coarse classification candidate letter aggregation that matched with inputted hand-written Latin letter is the coarse classification candidate letter aggregation with S=1, S=2, S=3 or S=4 according to different vertical cross number; when the transverse cross number is 2, calculate the transverse cross number UP in the ⅓ upper portion of the Latin letter, wherein when the transverse cross number in the ⅓ upper portion of the Latin letter is 2 or 3, directly determine that the coarse classification candidate letter aggregation matched with the inputted hand-written Latin letter is the coarse classification candidate letter aggregation with UP=2 or UP=3; when the transverse cross number in the ⅓ upper portion of the Latin letter is 1, calculate the vertical cross number of the hand-written Latin letter, and determine the coarse classification candidate letter aggregation that matched with inputted hand-written Latin letter according to the vertical cross number and the position information of the last new chirography coordinate point of the new chirography coordinate lattice in the standard Latin letter during the hand writing, and whether the left arch opening of the inputted Latin letter existing or not; when H=3, calculate the optimal vertical cross number of the inputted Latin letter, wherein when the optimal vertical cross number is 2 or 3, directly determine that the coarse classification candidate letter aggregation that matched with inputted hand-written Latin letter is the coarse classification candidate letter aggregation with Maxs=2 or Maxs=3; when the optimal vertical cross number is 1, determine the coarse classification candidate letter aggregation that matched with inputted hand-written Latin letter according to the position information of the last new chirography coordinate point of the new chirography coordinate lattice in the standard Latin letter during the hand writing, and whether the left arch opening of the inputted Latin letter existing or not; when H=4, calculate the transverse cross number Down in the ⅓ lower portion of the Latin letter, wherein when the transverse cross number in the ⅓ lower portion of the Latin letter is 2 or 3, directly determine that the coarse classification candidate letter aggregation matched with the inputted hand-written Latin letter is the coarse classification candidate letter aggregation with Down=2 or Down=3; when the transverse cross number in the ⅓ lower portion of the Latin letter is 1, calculate the vertical cross number of the hand-written Latin letter, and determine the coarse classification candidate letter aggregation that matched with inputted hand-written Latin letter according to the vertical cross number and the position information of the last new chirography coordinate point of the new chirography coordinate lattice in the standard Latin letter during the hand writing, and whether the left arch opening of the inputted Latin letter existing or not.

5. The identifying method of hand-written Latin letter, as recited in claim 4, wherein step (d.1) comprises the following steps of (d.1.1) scanning the new chirography coordinate lattice row by row from top to bottom, wherein when meet with the first new chirography coordinate point, set the row value to the current row under scanning, and define the row value as the top boundary of the letter, and scanning the new chirography coordinate lattice row by row from bottom to top, wherein when meet with the first new chirography coordinate point, set the row value to the current row under scanning, and define the row value as the bottom boundary of the letter; (d.1.2) scanning from the top boundary to the bottom boundary, record the number of the blank row where there is not new chirography coordinate point during the scanning, wherein when the number of the blank row equals to or is larger than 3 and next row of the last blank row of continuous blank rows is not blank, determine the inputted Latin latter is up-down structure.

6. The identifying method of hand-written Latin letter, as recited in claim 4, wherein in step (d.2), the calculation of the transverse cross number of the inputted hand-written Latin latter comprises the following steps of: (d.2.1a) scanning each row of the new chirography coordinate lattice transversely, and recording the times of non new chirography coordinate point changing to new chirography coordinate point, wherein the changing times is the initial transverse cross number; (d.2.2a) comparing the initial transverse cross number of each row in the new chirography coordinate lattice, and finding out the largest transverse cross number of the initial transverse cross numbers as the final transverse cross number of the letter; in step (d.2), the calculation of the vertical cross number of the inputted hand-written Latin latter comprises the following steps of: (d.2.1b) scanning each row of the new chirography coordinate lattice vertically, and recording the times of non new chirography coordinate point changing to new chirography coordinate point, wherein the changing times is the initial vertical cross number; (d.2.2b) comparing the initial vertical cross number of each row in the new chirography coordinate lattice, finding out all the initial vertical cross numbers that equals to 3 or is larger than 3, and finding out the largest vertical cross number of the initial vertical cross numbers as the final vertical cross number of the letter; in step (d.2), the calculation of the transverse cross number in the ⅓ upper portion and ⅓ lower portion of the hand-written Latin letter comprises the following steps of: (d.2.1c) scanning the new chirography coordinate lattice row by row from top to bottom, wherein when meet with the first new chirography coordinate point, set the row value to the current row under scanning, and define the row value as the top boundary of the letter i1, and scan the new chirography coordinate lattice row by row from bottom to top, wherein when meet with the first new chirography coordinate point, set the row value to the current row under scanning, and define the row value as the bottom boundary of the letter i2; (d.1.2c) calculating the ⅓ upper portion boundary i3, wherein i3=i1+⅓(i2−i1), and taking the rows between the top boundary i1 and the ⅓ upper portion boundary i3 as the ⅓ upper portion of the Latin letter; calculating the ⅓ lower portion boundary i4, wherein i4=i1+⅔(i2−i1), and take the rows between the bottom boundary i2 and the ⅓ lower portion boundary i4 as the ⅓ lower portion of the Latin letter; (d.1.3c) according to the calculation process of the transverse cross number of whole Latin letter, obtaining the initial transverse cross number of each row from the top boundary i1 to the upper boundary row i3, finding out all the initial transverse cross numbers that equals to 3 or is larger than 3, and finding out the largest transverse cross number of the initial transverse cross numbers as the final transverse cross number in the ⅓ upper portion of the letter; obtaining the transverse cross number in the ⅓ lower portion of the letter in the similar process mentioned above; in step (d.2), the calculation of the optimal vertical cross number of the inputted hand-written Latin letter comprises the following step of: (d.2.1d) during the calculation process of the vertical cross number of each row in the new chirography coordinate lattice, calculating the times of each initial vertical cross number, and taking the most frequently times as the optimal vertical cross number.

7. The identifying method of hand-written Latin letter, as recited in claim 6, wherein in step (d.2), the determining process of whether left arch opening existing in the hand-written Latin letter or not comprises the following steps of (d.2.1f) calculating the initial vertical cross number of each column in the new chirography coordinate lattice; (d.2.2f) scanning from the right column to the left column, finding out the first column whose the initial vertical cross number is not 0, and recording the column as k; (d.2.3f) when the initial vertical cross number of the (k−1)th column is larger than the initial vertical cross number of the kth column, defining the kth column as the reference column; when the initial vertical cross number of the (k−1)th column is smaller than the initial vertical cross number of the kth column, stopping scanning and determine that there is no left arch opening in this letter; when the initial vertical cross number of the (k−1)th column equals to the initial vertical cross number of the kth column, keeping scanning to the left until the initial vertical cross number of the (k−1)th column does not equal to the initial vertical cross number of the kth column, and defining the scanned column as the reference column; (d.2.4f) when the reference column is determined, recording the vertical ordinate of the mth in-through point Im_in on the scanned reference column, that is the row ordinate of the in-through point Im_in the new chirography coordinate lattice, recording the vertical ordinate of the mth out-through point Im_out, that is the row ordinate of the out-through point Im_out in the new chirography coordinate lattice, recording the vertical ordinate of the nth in-through point Jn_in on the scan line of the left column Ref_line_i−1 of next reference column, that is the row ordinate of the in-through point Jn_in the new chirography coordinate lattice, and recording the vertical ordinate of the nth out-through point Jn_out on the scan line of the left column Ref_line_i−1 of next reference column, that is the row ordinate of the out-through point Jn_out in the new chirography coordinate lattice, wherein m=1,2, . . . M, n=1,2, . . . N, M is the total number of the in-through point and out-through point of the scan line of the reference column, and N is the total number of the in-through point and out-through point of the scan line of the left column to the reference column; (d.2.5f) finding out the middle point Im_mid between each couple of matched the in-through point Im_in and the out-thought point Im_out on the scan line of the reference column; (d.2.6f) calculating the first straight distance between the each middle point Im_mid and the nth in-through point Jn_in, and finding out the in-through point on the scan line of the left column to the reference column that satisfy the first straight distance is less than or equals to 2; calculating the second straight distance between the each middle point Im_mid and the nth in-through point Jn_out, and finding out the out-through point on the scan line of the left column to the reference column that satisfy the second straight distance is less than or equals to 2, wherein n=1, 2, . . . N, and N is the total number of the in-through point and out-through point of the scan line of the left column to the reference column; (d.2.7f) calculating the middle point between the pth in-through point on the scan line of the left column to the reference column that satisfy the first straight distance is less than or equals to 2 and the pth out-through point on the scan line of the left column to the reference column that satisfy the first straight distance is less than or equals to 2, and determining whether a point of same row with one of the calculated middle points on the scan line of the reference column is 0 or not, wherein when the point of same row with one of the calculated middle points on the scan line of the reference column is not 0, determine that there is left arch opening in the inputted handwritten Latin letter; when the point of same row with one of the calculated middle points on the scan line of the reference column is 0, determine that there is no left arch opening in the inputted handwritten Latin letter; wherein p=1, 2 . . . P, when the total number of the in-through points on the scan line on the left column to the reference column that satisfy the first straight distance is less than or equals to 2 is less than the total number of the out-through points on the scan line on the left column to the reference column that satisfy the second straight distance is less than or equals to 2, P is the total number of the in-through points on the scan line on the left column to the reference column that satisfy the first straight distance is less than or equals to 2; when the total number of the in-through points on the scan line on the left column to the reference column that satisfy the first straight distance is less than or equals to 2 is more than the total number of the out-through points on the scan line on the left column to the reference column that satisfy the second straight distance is less than or equals to 2, wherein P is the total number of the out-through points on the scan line on the left column to the reference column that satisfy the second straight distance is less than or equals to 2.

8. The identifying method of hand-written Latin letter, as recited in claim 4, wherein in step (d.2), the determining process of the position of the last new chirography coordinate point in the new chirography coordinate lattice comprises the following steps of: (d.2.1e) scanning the new chirography coordinate lattice row by row from top to bottom, wherein when meet with the first new chirography coordinate point, set the row value to the current row under scanning, and define the row value as the top boundary of the letter i1, and scanning the new chirography coordinate lattice row by row from bottom to top, wherein when meet with the first new chirography coordinate point, set the row value to the current row under scanning, and define the row value as the bottom boundary of the letter i2; scanning the new chirography coordinate lattice row by row from left to right, wherein when meet with the first new chirography coordinate point, set the row value to the current row under scanning, and define the row value as the left boundary of the letter j1, and scanning the new chirography coordinate lattice row by row from right to left, wherein when meet with the first new chirography coordinate point, set the row value to the current row under scanning, and define the row value as the right boundary of the letter j2, wherein the top boundary i1, bottom boundary i2, left boundary j1, and the right boundary j2 constitute the smallest outer rectangle frame of the hand-written Latin letter; (d.2.2e) dividing the smallest outer rectangle frame evenly into a left-up rectangle frame, a left-down rectangle frame, a right-up rectangle frame, a right-down rectangle frame; (d.2.3e) determining that the last new chirography coordinate point falls into the left-up rectangle frame, the left-down rectangle frame, the right-up rectangle frame or the right-down rectangle frame, wherein when the last new chirography coordinate point falls into the left-up rectangle frame, the last new chirography coordinate point is in the left-up position of the inputted hand-written Latin letter; when the last new chirography coordinate point falls into the left-down rectangle frame, the last new chirography coordinate point is in the left-down position of the inputted hand-written Latin letter; when the last new chirography coordinate point falls into the right-up rectangle frame, the last new chirography coordinate point is in the right-up position of the inputted hand-written Latin letter; when the last new chirography coordinate point falls into the right-down rectangle frame, the last new chirography coordinate point is in the right-down position of the inputted hand-written Latin letter.

9. The identifying method of hand-written Latin letter, as recited in claim 1, wherein step (e) comprises the following steps of: (e.1) extracting the freeman chain code of the inputted hand-written Latin letter; (e.2) calculating the matching probability between the freeman chain code of the inputted hand-written Latin letter and the optimal Hidden Markov Models of each standard letter stored in a predetermined letter library and corresponding to each letter stored in the coarse classification candidate letter aggregation by using Viterbi Algorithm; (e.3) obtaining the maximum matching probability by sequencing each matching probability by using public Bubble Sort Algorithm; (e.4) determining the standard letter stored in the predetermined letter library and corresponding to the optimized matching probability as the final identifying result of Latin letter.

* * * * *